United States Patent
Pham

(10) Patent No.: US 12,475,143 B2
(45) Date of Patent: Nov. 18, 2025

(54) EVENT DATA PROCESSING

(71) Applicant: BlackBerry Limited, Waterloo (CA)

(72) Inventor: Khai Nhu Pham, Round Rock, TX (US)

(73) Assignee: BlackBerry Limited, Waterloo (CA)

( * ) Notice: Subject to any disclaimer, the term of this patent is extended or adjusted under 35 U.S.C. 154(b) by 508 days.

(21) Appl. No.: 17/712,013

(22) Filed: Apr. 1, 2022

(65) Prior Publication Data
US 2023/0315841 A1    Oct. 5, 2023

(51) Int. Cl.
*G06F 16/28* (2019.01)
*G06F 21/62* (2013.01)

(52) U.S. Cl.
CPC ........ *G06F 16/285* (2019.01); *G06F 21/6254* (2013.01); *G06F 2221/2101* (2013.01)

(58) Field of Classification Search
CPC .............. G06F 16/285; G06F 21/6254; G06F 2221/2101
See application file for complete search history.

(56) References Cited

U.S. PATENT DOCUMENTS

| | | |
|---|---|---|
| 6,366,926 B1 | 4/2002 | Pohlmann et al. |
| 6,694,362 B1 | 2/2004 | Secor et al. |
| 6,792,456 B1 | 9/2004 | Hellerstein et al. |
| 7,873,717 B1 | 1/2011 | Woolway |
| 8,365,278 B1 | 1/2013 | Njemanze et al. |
| 8,484,726 B1 | 7/2013 | Sutton |
| 9,390,128 B1 | 7/2016 | Seetala |
| 9,516,039 B1 | 12/2016 | Yen et al. |
| 9,516,053 B1 | 12/2016 | Muddu et al. |
| 9,760,426 B2 | 9/2017 | LeMond et al. |
| 10,305,758 B1 | 5/2019 | Bhide et al. |
| 10,719,375 B2 * | 7/2020 | Tucker .................... G06F 9/547 |
| 11,201,890 B1 | 12/2021 | Coull et al. |
| 11,269,876 B1 | 3/2022 | Basavaiah et al. |
| 11,782,987 B1 | 10/2023 | Raitz et al. |

(Continued)

OTHER PUBLICATIONS

Partial European Search Report in European Appln. No. 23165933.5, mailed on Aug. 8, 2023, 19 pages.

(Continued)

*Primary Examiner* — Van H Oberly
*Assistant Examiner* — Brooks T Hale
(74) *Attorney, Agent, or Firm* — Fish & Richardson P.C.

(57) ABSTRACT

Methods, systems, and apparatus, including computer programs encoded on computer storage media, for processing event log data. An example event log processing method includes receiving an event log comprising a plurality of event records describing events that have occurred on each of one or more computer systems over a period of time; converting the event log into a graph, comprising: normalizing the plurality of event records, including anonymizing a unique identifier value in each event record and replacing a variable value in each event record with a predetermined value; representing each normalized event record as one or more nodes in the graph; and generating a plurality of event clusters, wherein each event cluster includes an aggregated group of nodes and is generated based on common attributes of and hierarchical relationships between the normalized event records represented by the nodes in the aggregated group.

20 Claims, 15 Drawing Sheets

(56) References Cited

U.S. PATENT DOCUMENTS

| | | |
|---|---|---|
| 2007/0005596 A1* | 1/2007 | Brown .................... G06F 16/20 |
| 2010/0050260 A1 | 2/2010 | Nakakoji et al. |
| 2010/0235368 A1 | 9/2010 | Bhattacharya et al. |
| 2011/0227925 A1 | 9/2011 | De Pauw et al. |
| 2015/0074806 A1* | 3/2015 | Roundy .............. H04L 63/1425 726/23 |
| 2015/0370799 A1* | 12/2015 | Kushmerick ......... H04L 41/046 707/740 |
| 2015/0372855 A1 | 12/2015 | Kushmerick et al. |
| 2016/0342738 A1* | 11/2016 | Stalling ................. G16H 10/60 |
| 2016/0373293 A1 | 12/2016 | Kushmerick et al. |
| 2017/0075749 A1 | 3/2017 | Ambichl et al. |
| 2017/0085446 A1 | 3/2017 | Zhong et al. |
| 2017/0149793 A1 | 5/2017 | Spertus et al. |
| 2017/0155562 A1 | 6/2017 | Vasant et al. |
| 2018/0101423 A1 | 4/2018 | Yoon et al. |
| 2018/0322283 A1 | 11/2018 | Puri et al. |
| 2019/0109809 A1 | 4/2019 | Wang et al. |
| 2019/0228085 A1 | 7/2019 | Biswas et al. |
| 2020/0059481 A1 | 2/2020 | Sekar et al. |
| 2020/0065483 A1 | 2/2020 | Mu et al. |
| 2020/0193239 A1 | 6/2020 | Wilson et al. |
| 2020/0334093 A1 | 10/2020 | Dubey et al. |
| 2021/0004386 A1 | 1/2021 | Andritsos |
| 2021/0064749 A1 | 3/2021 | Weizman et al. |
| 2021/0203644 A1 | 7/2021 | Kao et al. |
| 2021/0203673 A1 | 7/2021 | Santos et al. |
| 2021/0287246 A1 | 9/2021 | Zhang et al. |
| 2021/0382746 A1 | 12/2021 | Sharma et al. |
| 2022/0066998 A1 | 3/2022 | Jha et al. |
| 2022/0100857 A1 | 3/2022 | Filar et al. |
| 2023/0289444 A1 | 9/2023 | Ermey |
| 2023/0315603 A1 | 10/2023 | Pham |
| 2023/0315884 A1 | 10/2023 | Pham |

OTHER PUBLICATIONS

Extended European Search Report in European Appln. No. 23165933.5, mailed on Dec. 19, 2023, 16 pages.

Extended European Search Report in European Appln. No. 23165938.4, dated Aug. 9, 2023, 11 pages.

International Search Report and Written Opinion in International Appln. No. PCT/US2023/015504, mailed on Jun. 29, 2023, 14 pages.

Ramaki et al., "Towards event aggregation for reducing the volume of logged events during IKC Stages of APT attacks" Submitted on Sep. 2021, arXiv:2109.14303v1, 34 pages.

Non-Final Office Action in U.S. Appl. No. 17/712,024, mailed on Oct. 25, 2023, 19 pages.

U.S. Appl. No. 17/712,005, Pham, filed Apr. 1, 2022.

U.S. Appl. No. 17/712,024, Pham, filed Apr. 1, 2022.

Blackberry.com [online], "Endpoint Detection and Response from Blackberry" Apr. 2021. [retrieved on Apr. 19, 2022], retrieved from : URL <https://www.blackberry.com/us/en/products/unified-endpoint-security/blackberry-optics>, 6 pages.

Lanzi et al., "Accessminer: using system-centric models for malware protection." Proceedings of the 17th ACM conference on Computer and communications security, Oct. 2010, 14 pages.

Zhu et al., "Federated heavy hitters discovery with differential privacy." International Conference on Artificial Intelligence and Statistics. PMLR, 2020, 10 pages.

Final Office Action in U.S. Appl. No. 17/712,024, mailed on Mar. 19, 2024, 16 pages.

Non-Final Office Action in U.S. Appl. No. 17/712,005, mailed on Mar. 29, 2024, 55 pages.

* cited by examiner

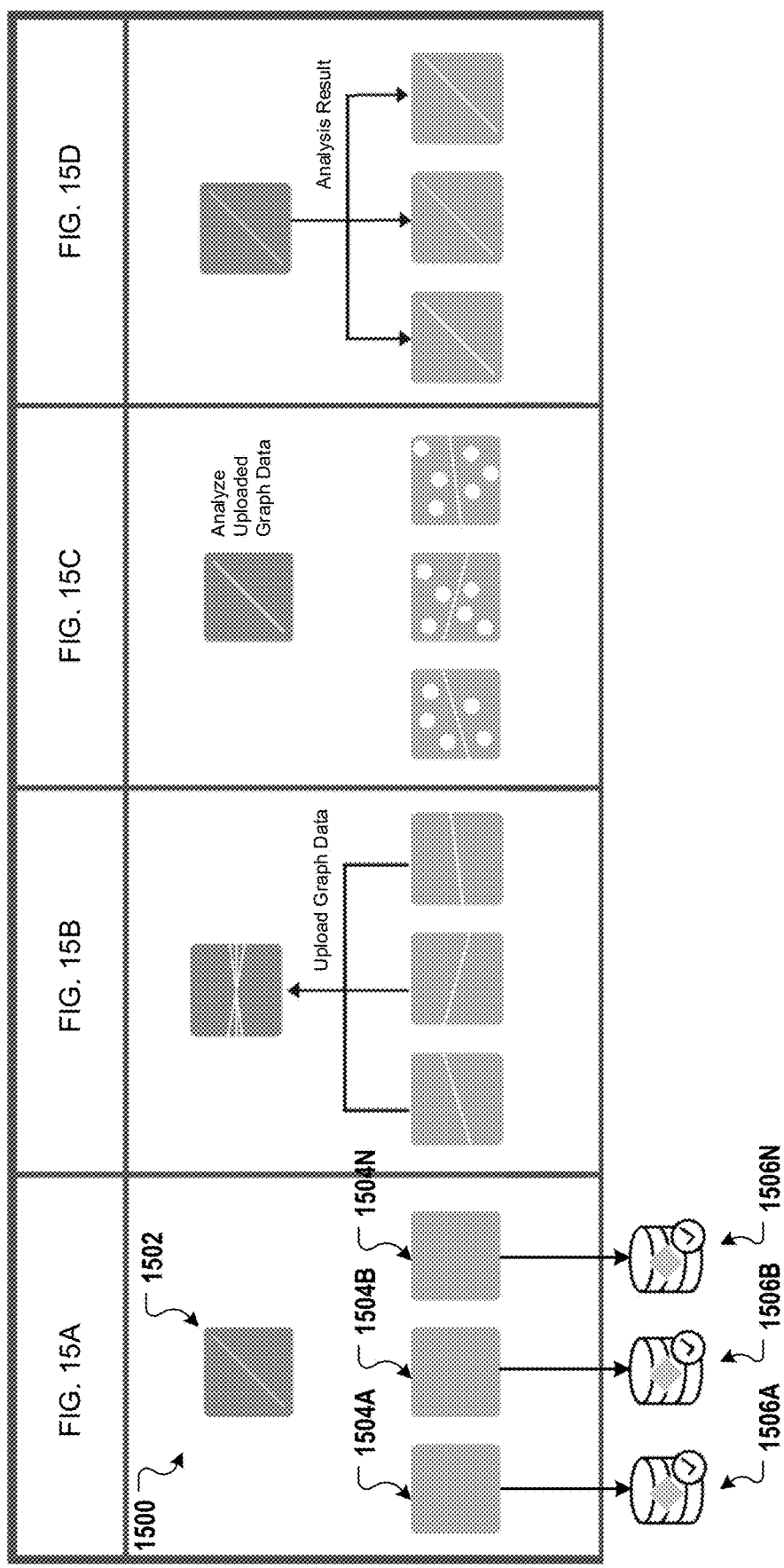

EVENT DATA PROCESSING

TECHNICAL FIELD

The present disclosure relates to event data processing. In some examples, the event data may comprise information about a file write event, a file read event, or a file manipulation event (e.g., cut, paste, copy, move, open, read, save, etc.) of at least a portion of a digital file or it may include a manipulation of the entire file. In some examples, the event data may comprise information about a process creation, a logon, accounts performing process creations or logons, or the like.

BACKGROUND

Organizations often need to store and manage large amounts of digital files. Organizations often need to utilize large amounts of executable software. Organizations often need to track, record, and/or analyze patterns of events associated with the stored digital files, the utilized software, or both. In the case of digital files, the event data includes indications of write, read, or manipulation events to the stored data and each indication includes respective values for a plurality of event attributes. In the case of executable software, event logs can include information about process creations, logons, accounts performing process creations or logons, or the like. As used herein, a process creation refers to a type of event including information about an instance of a computer program that is being executed, and a logon refers to a type of event recording the attempted authentication of an account onto a machine.

Correspondingly, managing large amounts of files or utilizing large amounts of software or both may result in generation of a large volume of event data. Not only does a large volume of event data add to the overall cost of data storage, but it also poses a challenge to how the event data may be effectively analyzed, e.g., for anomaly or suspicious activity detection.

DESCRIPTION OF DRAWINGS

FIG. 6 shows an illustration of an example event log.

FIG. 10 shows a visualization of example event clusters.

FIG. 15 shows an illustration of an example federated analytics environment.

Like reference numbers and designations in the various drawings indicate like elements.

DETAILED DESCRIPTION

Figure 1:
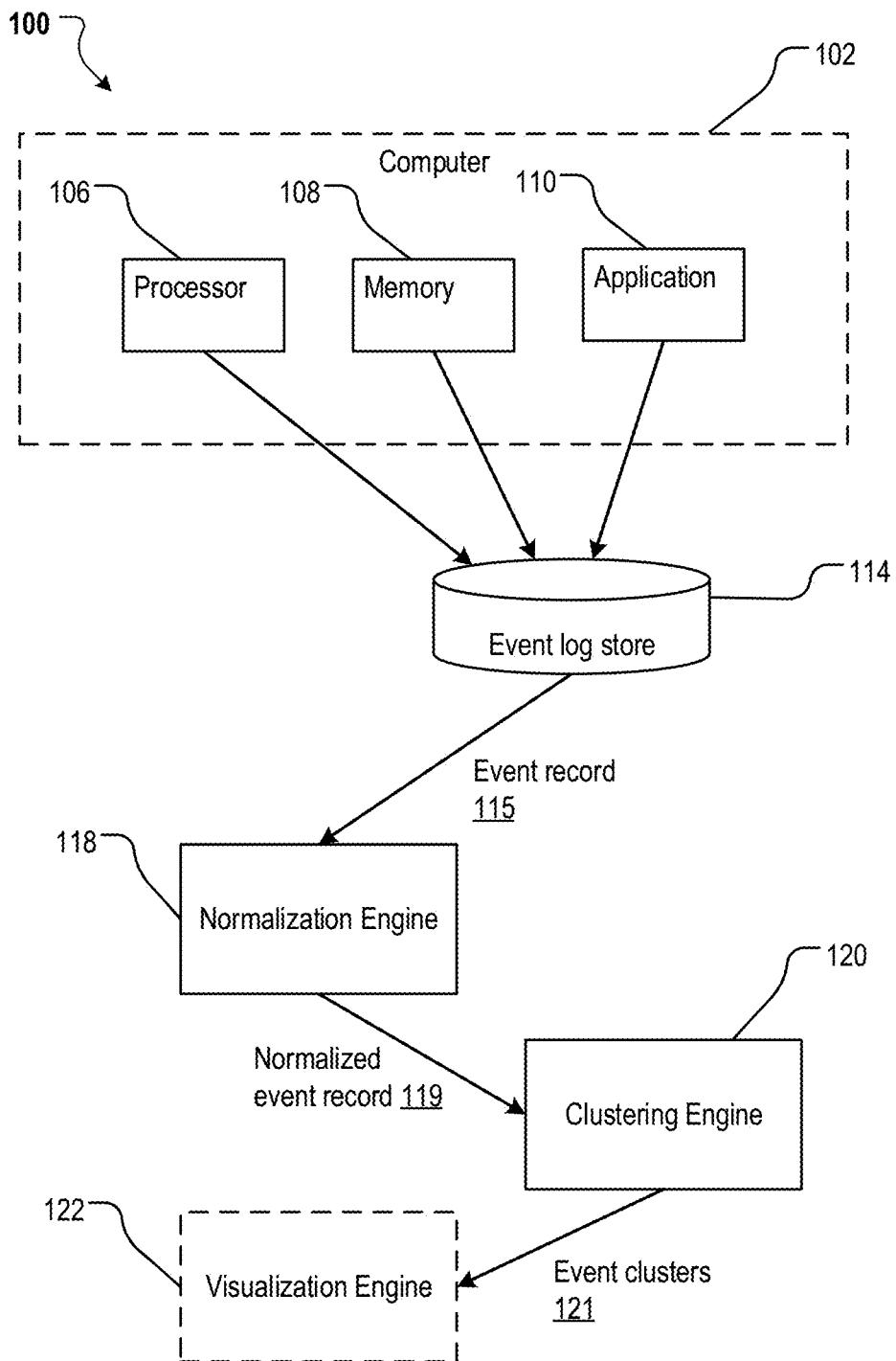
FIG. 1 is a block diagram showing an example event log processing system, according to an implementation.

Techniques described herein provide a method to cluster large volumes of event log data into categories. Each category can include a group of similar and related event records. The categories can be generated in the form of a graph that has nodes representing different event records, and edges between the nodes representing corresponding relationships between the different event records.

As will be described further below, because of the aggregation, merging, and data reduction techniques such as data compression or deduplication used in generating the categories, the generated graph, which may be orders of magnitude smaller in size than the original event log data, is useful in facilitating better usage of the storage resource that would be otherwise required for storing the original event log in raw format.

Additionally or alternatively, the graph may be used in many other ways. In some cases, the categories may then be used for threat (e.g., malware), anomaly or suspicious activity detection. In some cases, the categories may then be analyzed, e.g., under a federated analytics framework, to derive meaningful patterns and provide analytical insight to user for better decision making and improved cybersecurity in a variety of settings. In some cases, the categories may then be graphically presented. Clustering and visually presenting event logs can help human decision makers to gain insights for improving cybersecurity.

Specifically, the method involves normalizing the plurality of event records, including anonymizing a unique identifier value in each event record and replacing a variable value (e.g., a transient value) in each event record with a predetermined uniform value, or with a variable name. The method involves representing each normalized event record as one or more nodes in the graph. In some cases, each node can represent a respective segment of a given event record which has multiple segments, e.g., separated by delimiting characters. The method involves generating a plurality of event clusters, wherein each event cluster includes an aggregated group of nodes and is generated based on common attributes of and hierarchical relationships between the normalized event records represented by the nodes in the aggregated group.

The method is flexible enough to accommodate various types of event logs. For example, the event logs may comprise information about a file write event, a file read event, or a file manipulation event (e.g., cut, paste, copy, move, open, read, save, etc.) of at least a portion of a digital file or it may include a manipulation of the entire file. As another example, the event logs may comprise information about a process creation, a logon, accounts performing process creations or logons, or the like. As yet another example, the event logs may be collected from different computers implementing different computer operating systems, such as Windows, Macintosh, Linux, and the like, and the method may be adapted to the specific operating system, while maintaining a uniform clustering process across the multiple operating systems.

Techniques described herein produce one or more technical effects. Some of the described techniques facilitate more efficient usage of the storage resource and computing resource. For example, an entire copy of the event log in raw format may no longer be kept. Instead, only data describing the event log categories, which represent the event records in a significantly more data efficient manner, need to be stored and can be utilized in range of technical use cases. Some of the described techniques derive meaningful patterns and provide analytical insight as a result of automatically analyzing the event log categories. The analytical insights derived from the event log may then facilitate improvement in cybersecurity, e.g., enhanced threat or suspicious activities detection capabilities. Some of the described techniques can aid in a human decision maker to understand both prevalent and abnormal software behaviors that would otherwise be rendered obscure in millions or billions of pieces of event records. By clustering and visually presenting similar and related event logs, the techniques can aid in cybersecurity experts, or even tenant administrators, to better understand the way a malware typically behaves and correspondingly craft more effective threat detection rules.

FIG. 1 is a block diagram illustrating an example event log processing system 100 where event log data processing is applied. The system 100 includes a computer 102. At a high level, the computer 102 is an electronic computing device operable to receive, transmit, process, store, or manage data. According to some implementations, the computer 102 can also include or be communicably coupled with an application server, e-mail server, web server, caching server, streaming data server, business intelligence (BI) server, and/or other server. Although illustrated as a single computer 102 in FIG. 1, two or more computers may be included in the system 100 according to particular needs, desires, or particular implementations of the system 100. Further, this disclosure contemplates that many users may use one computer 102, or that one user may use multiple computers 102.

The computer 100 includes at least one processor 106. Although illustrated as a single processor 106 in FIG. 1, two or more processors may be used according to particular needs, desires, or particular implementations of the computer. Generally, the processor 106 executes instructions and manipulates data to perform the operations of the computer 102.

The computer 100 also includes a memory 108 that holds data for the computer 102. The data can include files and computer programs, to name just a few examples. Although illustrated as a single memory 108 in FIG. 1, two or more memories may be used according to particular needs, desires, or particular implementations of the computer 102. While memory 108 is illustrated as an integral component of the computer 102, in alternative implementations, memory 108 can be external to the computer 102.

The application 110 is an algorithmic software engine providing functionality according to particular needs, desires, or particular implementations of the computer 102, particularly with respect to functionality required for providing software services to users of the computer 102. Software services, such as those provided by the application 110, provide reusable, defined functionalities through a defined interface. For example, the interface may be software written in JAVA, C++, or other suitable languages providing data in Extensible Markup Language (XML) format or other suitable format. Although illustrated as a single application 110, the application 110 may be implemented as multiple applications 110 on the computer 102. In addition, although illustrated as integral to the computer 102, in alternative implementations, the application 110 can be external to the computer 102.

Event data can be generated by different components 106, 108, or 110 of the computer 102 and as a result of interaction between the computer 102 with internal users (e.g., from a command console or by another appropriate access method), external or third parties, other automated applications, as well as any other appropriate entities, individuals, systems, or computers. In addition, the computer 102 can collect event data including multiple event records 115 over a network, e.g., from a web browser or a client application, e.g., an installed plugin. In some examples, the event data may comprise information about a file write event, a file read event, or a file manipulation event (e.g., cut, paste, copy, move, open, read, save, etc.) of at least a portion of a digital file stored in the memory 108 or on a server communicably coupled to the computer 102. In these examples, the event data received may comprise file (or directory) path information that identifies a location of the digital file. In some examples, the event data may comprise information about a process creation (or termination) of the application 110, a logon of the application 110, accounts performing process creations or logons, or the like. In these examples, the event data may be received in a tree format, where a set of processes form a tree in accordance with an order of creation of the processes.

Each event record 115 can be structured or semi-structured text that conforms to some specific log format and that describes an operation on an object.

As a specific example, an event record may describe a file read operation performed on a local file. In this example, the event record may include a file (or directory) path:
"C:\Program Files (x86) \Microsoft\Edge\Application\msedge.exe",
which is a string of characters used to uniquely identify a location in a directory structure. A file path may be composed by following the directory tree hierarchy in which segments, separated by delimiting characters, represent different directories (or subdirectories). In this example, "C:" is the root directory name, "Program Files (x86)" is the shared directory name, "Microsoft\Edge\Application" is the application directory name, "msedge" is the file name, and ".exe" is the extension name.

As another specific example, an event record may describe a file browse operation performed on an internet file. In this example, the event record may include a uniform resource locator (URL), which occurs most commonly to reference web pages (http) but are also used for file transfer (ftp), email (mailto), database access (JDBC), and many other applications. An example URL could have the form:
"http://www.example.com/index.html",
which indicates a protocol ("http"), a hostname ("www.example.com"), and a file name ("index.html").

As yet another specific example, an event record may describe a creation of a process. In this example, the event record may include command line text. A command line typically begins with the name of a command, which is an executable program in its own right, and the command line often includes textual arguments to the command. When included, the arguments may include subcommands which in turn have their own set of recognized arguments. Similar to file paths and URLs, each command line may include multiple segments separated by delimiting characters.

An event log store 114 can gather and store the event records.

Figure 6:
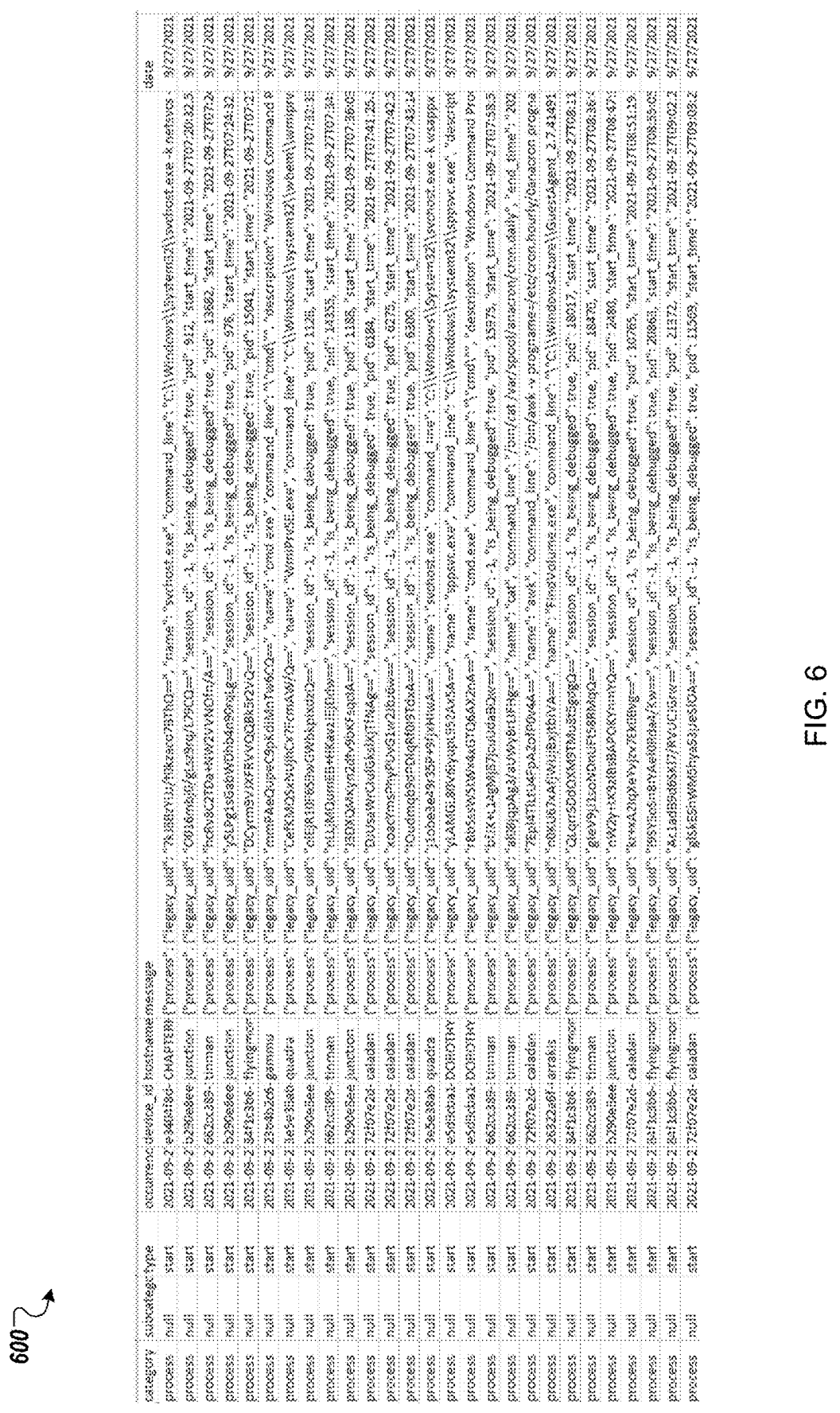

FIG. 6 shows an illustration 600 of an example event log. The example event log includes a plurality of raw process start event records stored in a table format, with event records as the rows and fields as columns. Each field stores a different type of information related to a given event record, such as the category, subcategory, type, occurrence timestamp, device id, hostname, message (which may in turn include a command line, a file path, an URL, or a combination thereof), or date of (an object described by) the given event record.

The system 100 includes a normalization engine 118. The normalization engine 118 includes software executing on one or more processors and causes the one or more processors to normalize the event records 115. The normalization engine 118 processes each event record 115 in accordance with a set of normalization rules in order to reduce data redundancy and improve data integrity.

The system 100 includes a clustering engine 118. The clustering engine 120 includes software executing on one or more processors and causes the one or more processors to cluster the normalized event records 119 to multiple groups. Each group, which will be referred to below as an event cluster 121, includes a category of similar and/or related event records.

The event clusters 121 can be generated in the form of a graph data structure (or graph, for short) that has nodes and edges between the nodes. Each node can represent one or more normalized event records. The event clusters 121 can represent the common attributes or properties of the objects and/or operations performed on the objects, e.g., (partially) identical commands or file paths, that are described by the normalized event records represented by the nodes included in each group. The event clusters can also represent the hierarchical relationships between the objects and/or operations performed on the objects, e.g., a parent-child process relationship or a file hierarchy, described by the normalized event records represented by the nodes included in each group.

Figure 7:
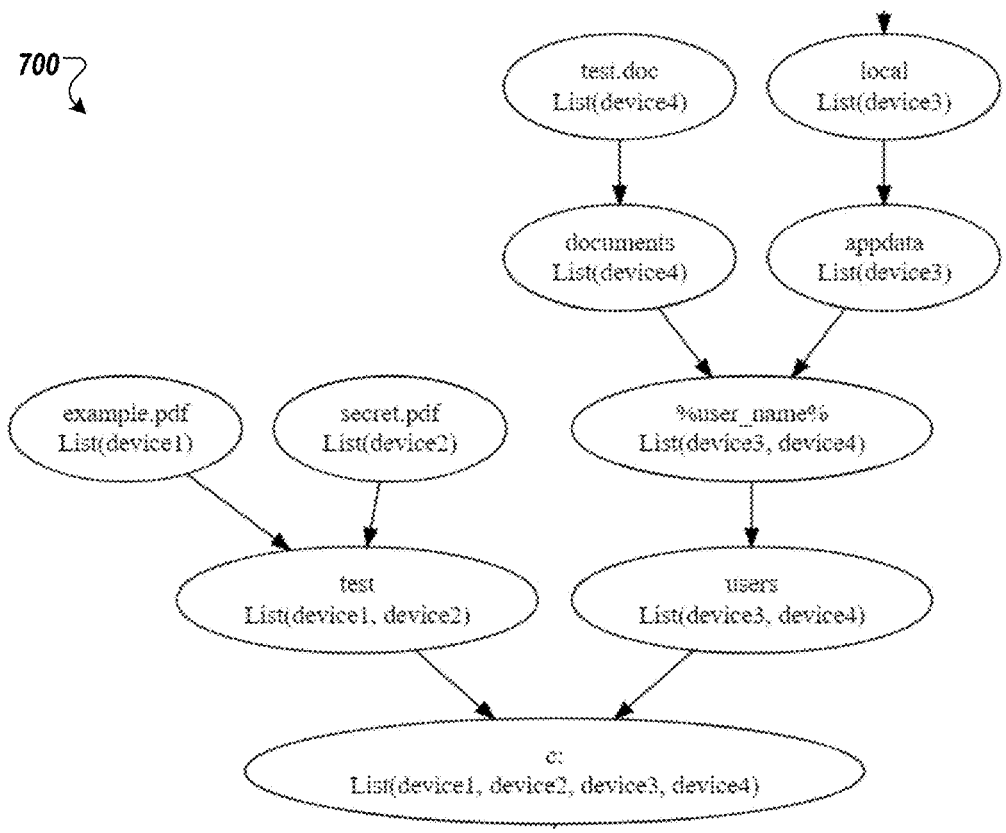
FIG. 7 shows an illustration of an example event cluster.

FIG. 7 shows an illustration 700 of an example event cluster in the form of a graph that has nodes and edges between the nodes. In the example of FIG. 7, each node in the graph can represent a respective segment of a file path included in a given event record, which identifies an object (e.g., a file, an executable, or the like) described by the given event record. Each node is connected to another node by directed edges in a way that reflects the hierarchical relationships between different (segments of) file paths included in multiple event records. As shown, a root node in the graph can represent a same root directory name ("C:") across different file paths included in multiple event records. The root node is connected its child nodes by outgoing edges that represent different subdirectory names.

In addition, each node can be labeled (or tagged), and the graph can have associated label data that describes properties or attributes related to the objects that are described by the event records represented by the nodes. These object properties or attributes can be derived by the system 100 from processing, i.e., normalizing and clustering, the event log 115. As one example of such label data, table 720 of FIG. 7 shows various file path attributes of one or more event records represented by node "test".

Figure 8:
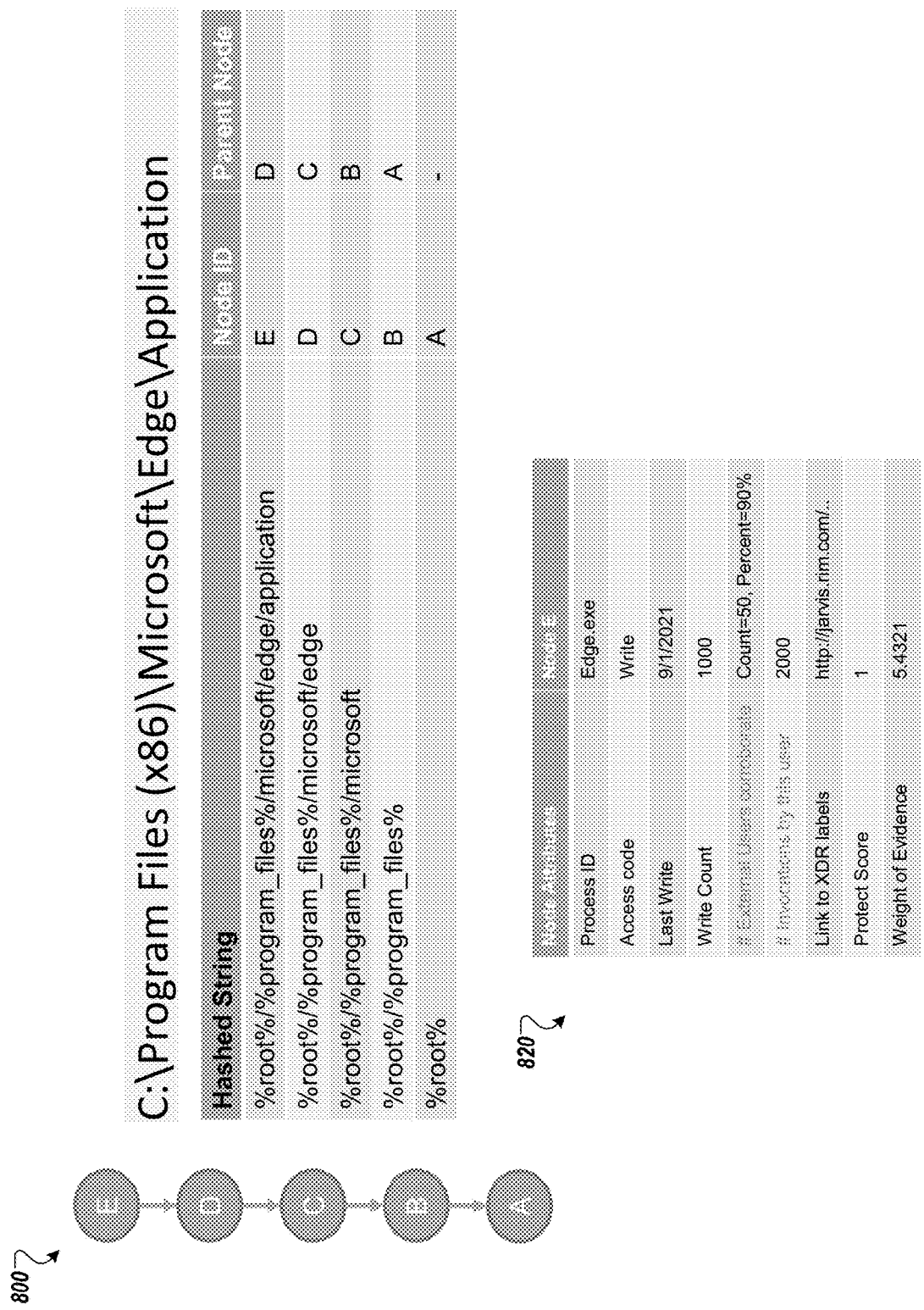
FIG. 8 shows an illustration of another example event cluster.

FIG. 8 shows an illustration 800 of another example event cluster in the form of a graph that has nodes A-E and edges between the nodes. In the example of FIG. 8, each node in the graph can represent a respective segment of a file path included in a given event record, which identifies an object (e.g., a file, an executable, or the like) described by the given event record. Each node is connected to another node by directed edges in a way such that the file path may be reconstructed given the way the nodes are connected. As shown, root node A represents the root directory name, leaf node E represents the application directory name, and the full file path may be reconstructed by traversing the graph from the leaf node E backwards to the root node A.

As another example of label data associated with the graph that describes event properties or attributes, table 820 of FIG. 8 shows various executable attributes of one or more event records represented by node "E".

Figure 9:
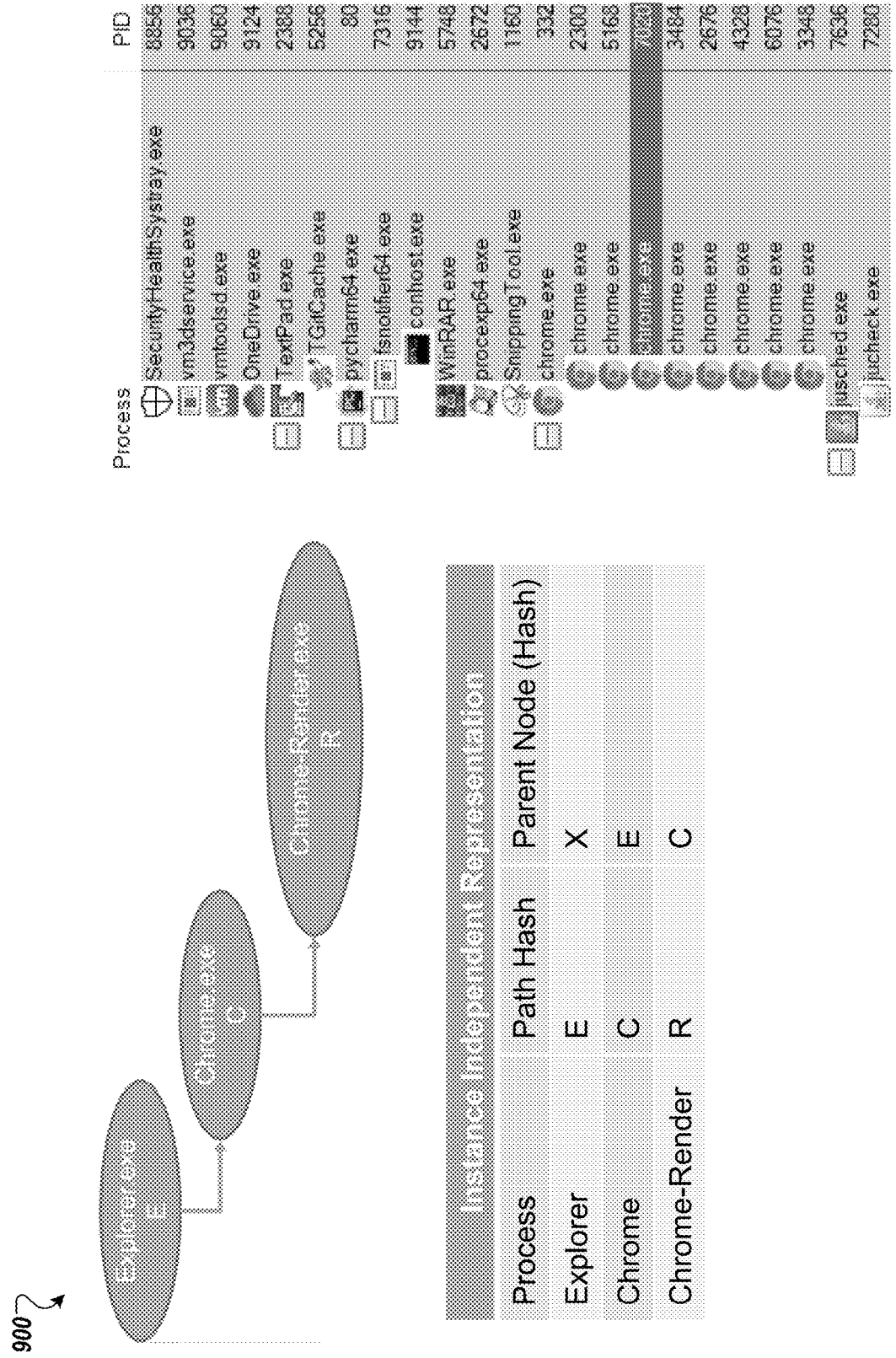
FIG. 9 shows an illustration of another example event cluster.

FIG. 9 shows an illustration 900 of another example event cluster in the form of a graph that has nodes E, C, R and edges between the nodes. In the example of FIG. 9, each node in the graph can represent a respective process (or a corresponding executable that the process is executing). Each node is connected to another node by directed edges in a way that reflects the hierarchical relationships within process creation. As shown, child node R represents a process to execute an executable ("Chrome-Render.exe") that is created by a parent process represented by the parent node C of the child node R that executes another executable ("Chrome.exe").

The system 100 optionally includes a visualization engine 122 which, when included, creates visualizations of the event clusters 121. The visualizations can be displayed on an output device of the system 100, e.g., by presenting the event clusters in a graphical user interface, to allow a user to visualize the various information represented the event clusters 121.

In some implementations, these visualizations can be generated as an image format file, which includes an illustration of the graph that has node and edges between the nodes. In other implementations, these visualizations can be generated as a HyperText Markup Language (HTML) document or another structured document, which includes text describing the nodes and shows the group hierarchy between the nodes described by the text in an expandable/collapsible manner to improve readability. These visualizations may aid in threat hunters or cybersecurity researchers to better understand the way a malware typically behaves and correspondingly create more effective threat detection and response solutions.

Figure 10:
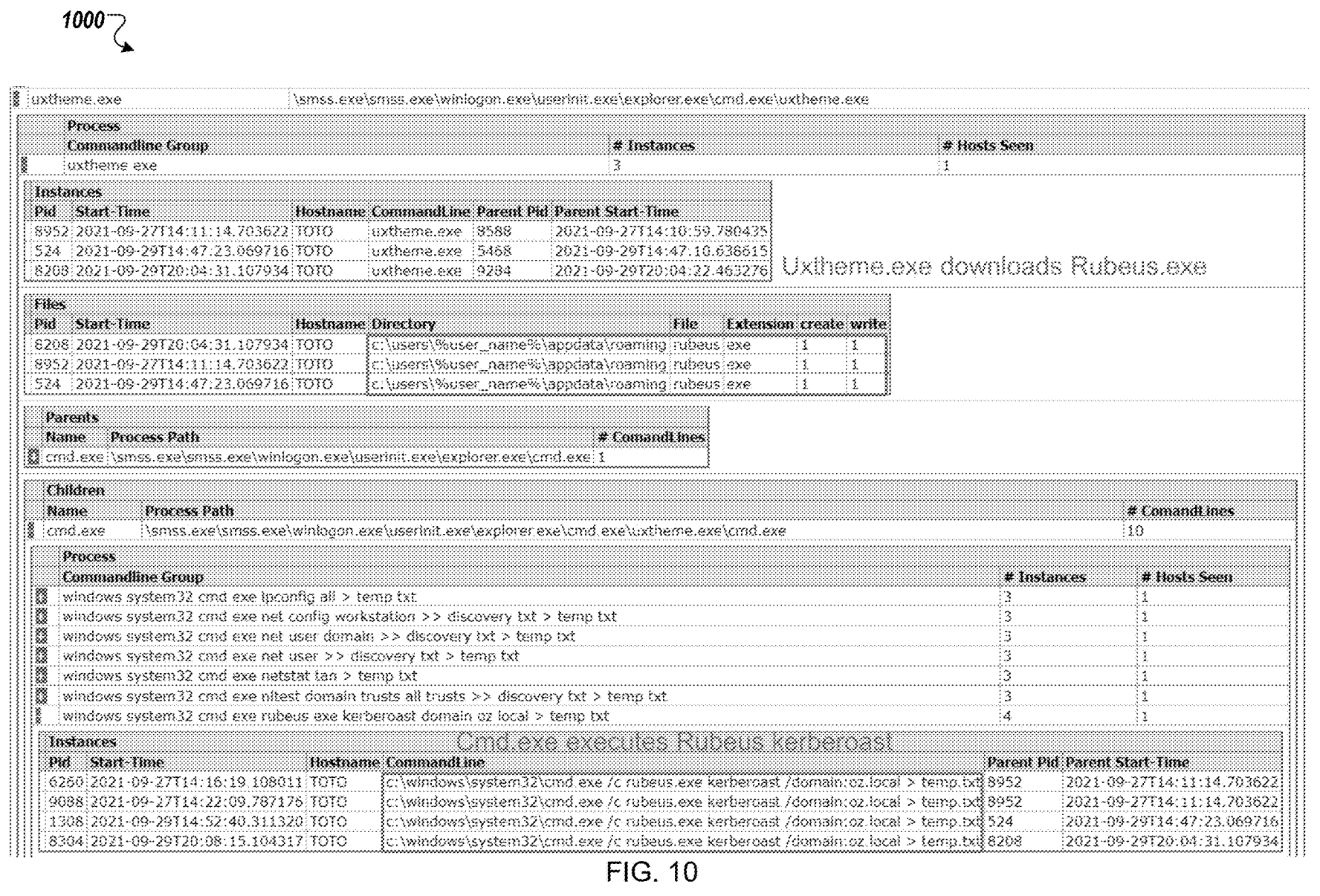

FIG. 10 shows a visualization 1000 of example event clusters that are generated from an event log in the form of a HyperText Markup Language (HTML) document. Compared with the raw event log, e.g., the event log shown in the illustration 600 of FIG. 6, that may have a large number of event records arranged in a chronological order, the visualization 1000 is a far more concise representation of the plurality of event records included in the event log. In addition, as shown for example by the boxes and their associated annotations, the event clusters are presented in an intuitive way where the common attributes of and the hierarchical relationships between different event records are presented visually, helping a viewer to quickly understand a behavior or pattern of certain objects and/or operations performed on the objects described in the event log.

The visualization engine 122 could also create visualizations of other representations of the event log that may be generated by the clustering engine 120. For example, the visualization engine 122 can visualize a compacted representation with a hierarchical tree structure format that has a bottom-up view from a particular process that shows multiple processes that each start the particular process as a child process.

Figure 11:
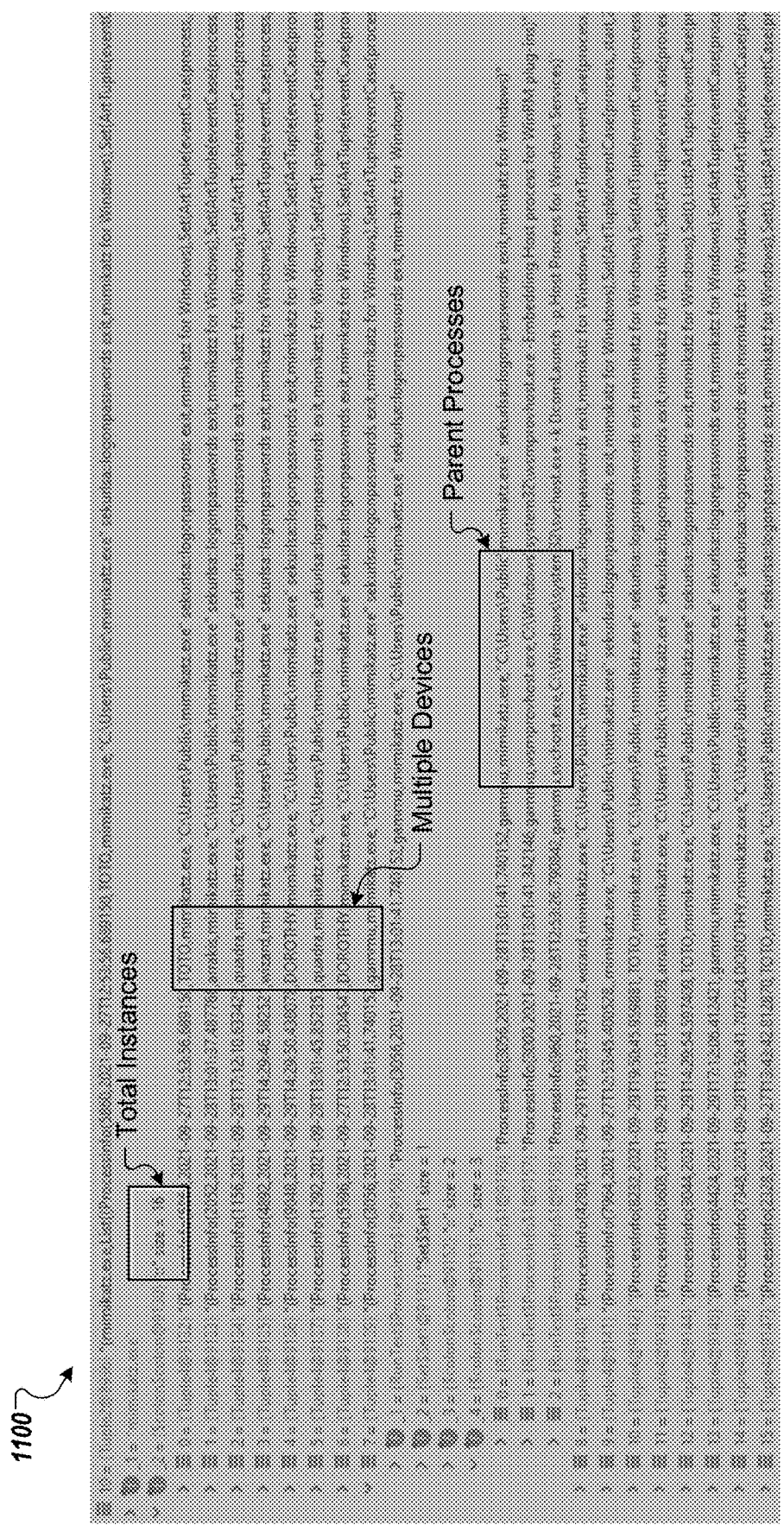
FIG. 11 shows an illustration of example compacted representations of an event log with a hierarchical tree structure format.

FIG. 11 shows an illustration 1100 of an example compacted representation of an event log with a hierarchical tree structure format. The illustration 1100 is a bottom-up view from the "mimikatz" process that shows which devices, or what parent processes, started the "mimikatz" process as a child process over a time period during which the event log is collected. The illustration 1100 also shows event statistics generated from the event log, such as a total count of process instances that started the "mimikatz" process.

As another example, the visualization engine 122 can visualize a compacted representation with a hierarchical tree structure format that has a top-down view from a particular process that shows multiple child processes started by the particular process as a parent process.

Figure 12:
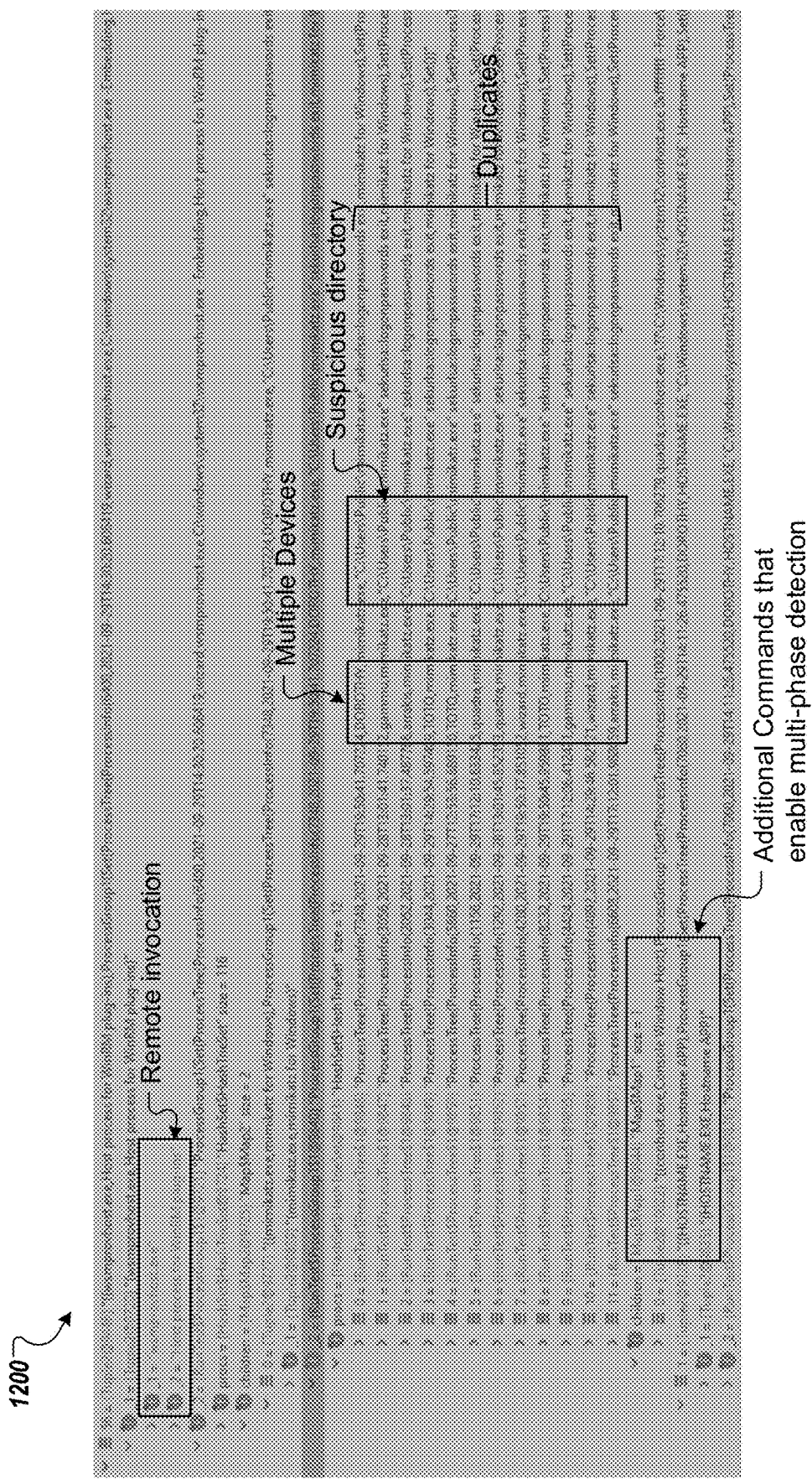
FIG. 12 shows an illustration of another example compacted representations of an event log with a hierarchical tree structure format.

FIG. 12 shows an illustration 1200 of another example compacted representation of an event log with a hierarchical tree structure format. The illustration 1200 is top-down view from the "svchost" process that shows what child processes have been started by the "svchost" process as a parent process over a time period during which the event log is collected. The illustration 1200 also shows relevant attributes of the "svchost" process generated from the event log, such as the location of the process, the command used by the process, and the like.

Figure 2:
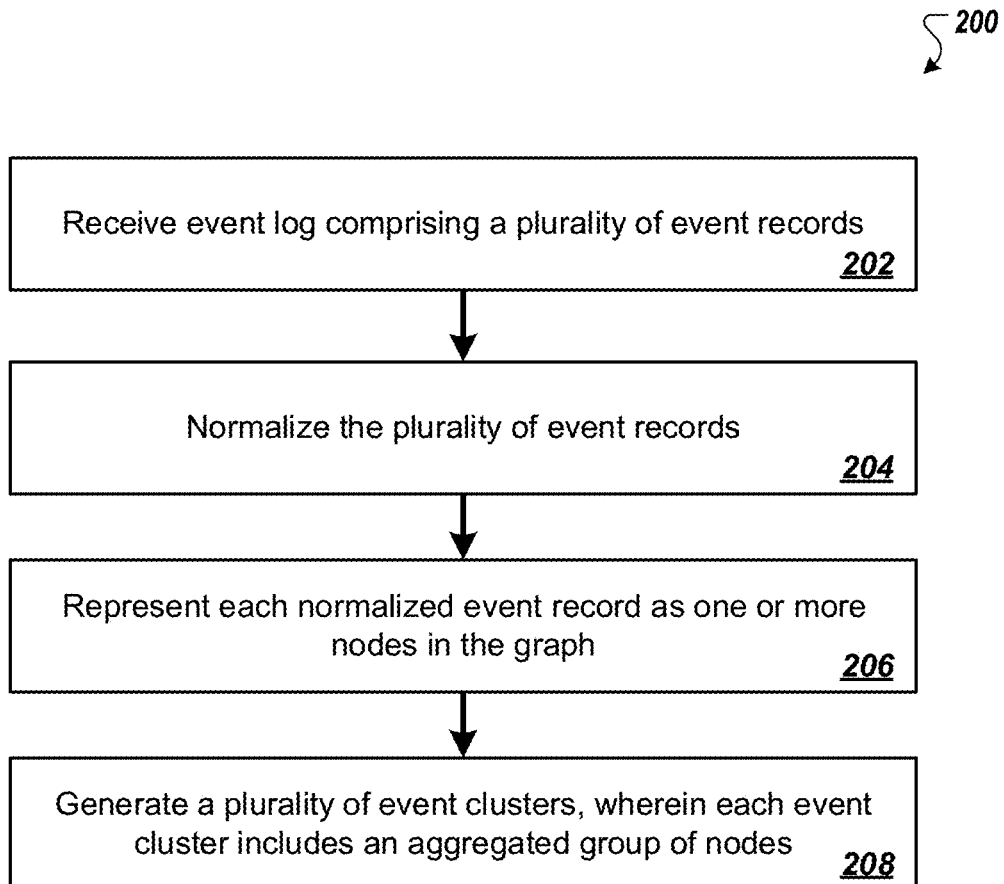
FIG. 2 is a flowchart showing an example process for clustering an event log, according to an implementation.

FIG. 2 is a flowchart showing an example process 200 for clustering an event log, according to an implementation. For convenience, the process 200 will be described as being performed by a system of one or more computers located in one or more locations. For example, a system, e.g., the event log processing system 100 of FIG. 1, appropriately programmed, can perform the process 200. The example process 200 shown in FIG. 2 may also be implemented using additional, fewer, or different operations, which can be performed in the order shown or in a different order.

In general, the process 200 may be repeated as often as necessary to obtain the graph of the most recent event log. For example, the process 200 may be repeated once a day, or once a week, or once a month. As another example, the process 200 may be triggered whenever the size of the event log file reaches a threshold, e.g., one gigabyte (1 GB), two gigabytes (2 GB), ten gigabytes (10 GB), or the like. As another example, the process 200 may be streamed continuously according to a sliding time window.

The system receives an event log that includes a plurality of event records (202). Each event record describes one or more events that have occurred on a computer system over a period of time, e.g., over the past 24 hours, 7 days, or 30 days.

In some examples, the event log data may comprise information about a file write event, a file read event, or a file manipulation event (e.g., cut, paste, copy, move, open, read, save, etc.) of at least a portion of a digital file. That is, the received event log can include a plurality of file write event records, file read event records, file manipulation event records, or a combination thereof. In these examples, each event record may comprise file (or directory) path information that identifies a location of the digital file. In some examples, the event log data may comprise information about a process creation (or termination) of the application, a logon of the application, accounts performing process creations or logons, or the like. In these examples, the event log may comprise a plurality of process creation event records arranged in a tree format, where a set of processes form a tree in accordance with an order of creation of the processes.

The system can also receive the event log from any of a variety of sources. For example, the event logs may be collected from different computers implementing different computer operating systems, including Windows, Macintosh, and Linux. In some implementations, the system automatically determines the type of the operating system from the received event log. To do so, the system can for example utilize information contained in the received event log such as executable process types and known directory names that are specific to a particular type of operating system. Correspondingly, in these implementations, the system selects, as the respective set of conversion algorithms for use in performing the following steps 204-208, a set of conversion algorithms that corresponds to the operating system (OS) running on the computer system at the time the event records were created from a plurality of candidate sets of conversion algorithms that are maintained by the system and that correspond respectively to different operating systems.

The system normalizes the plurality of event records (204), including anonymizing a unique identifier value in each event record and replacing a variable value in each event record with a predetermined value.

In event record normalization, some of the specific details in the event records are either removed or replaced by another common value. This allows for the system to protect the private or sensitive information of (the individual users of) the computer system, and to bring together event records that originally appeared to be very different. For example, a known user directory path name defined in a file access event record, which may not be important in software behavior analysis and may further cause privacy leakage concerns, can be either removed or replaced by some other predetermined text or variables. As another example, the transient values included in a process creation event record, such as process PID, occurrence timestamp, handle, and port values, can be replaced by regularized values, or simply removed. As yet another example, whole numbers or punctuations, such as the delimiting characters used to separate different record segments, can be removed from an event record.

For example, the following command line included an event record
   "100   c:\windows\system32\svchost.exe-k   netsvcs-p-s schedule" can be normalized into:
   "windows system32 svchost exe k netsvcs p s schedule".

The system represents each normalized event record as one or more nodes in the graph (206). In some implementations, the system represents each different segment of a normalized event record as a respective node in the graph. For example, as illustrated in FIG. 7, a file access event record having three different segments—"C:\", "test\", and "example.pdf" are represented by three different nodes in the graph, respectively.

In some implementations, to represent a corresponding event record segment with a node, the system associates the segment with some predetermined index (or key) that can be used to uniquely identify the segment, and stores the predetermined index, instead of the segment, at the node. This can improve data efficiency. For example, the predetermine index can be an alphabetical letter, a word, a phrase, a number, or a symbol, and the system can maintain a mapping table that specifies the corresponding relationships between the different segments and correspondingly indices used to identify the segments. As a particular example, the predetermined indices can be the hash values generated by applying a predetermined hash function, e.g., a hash functions based on hashing algorithms such as MD5, SHA-1, SHA-2, or SHA-3, to the different segments.

In some implementations, each node in the graph also represents properties or attributes of an object (e.g., a file, an executable, or the like) described by the associated normalized event records. In these implementations, for each of some of the nodes in the graph, the system can maintain graph label data that includes the properties or attributes of the object that is described by the event record represented by the node. Additionally or alternatively, the graph label data can include the compiled statistics of various operations performed on the object that is described by the event record represented by the node. Table 720 of FIG. 7 and table 820 of FIG. 8 show examples of such properties, attributes, or statistics that can be associated with each node.

The system generating a plurality of event clusters from the normalized event records (208). Each event cluster includes an aggregated group of nodes.

Generating the event clusters can include the operations of merging multiple nodes into an aggregated cluster based on the common attributes or properties of the objects and/or operations performed on the objects that are described by the normalized event records represented by the nodes. In some examples, multiple nodes can be grouped based on a common segment of the event records represented by these nodes, e.g., a (partially) identical command line or file path. In some examples, multiple nodes can be grouped based on common attributes that are derived by running a deterministic finite automaton (DFA) algorithm over the received event log.

Generating the event clusters can include the operations of determining the hierarchical relationships between the normalized event records from the received event log; and connecting the nodes included in the aggregated group of nodes in accordance with the determined hierarchical relationships. In some examples, the system can parse or decompose the content of these normalized event records to identify the inherently hierarchical relationships between the objects and/or operations performed on the objects described by the normalized event records, e.g., to identify a parent-child process relationship or a file hierarchy. In some examples, the system can connect the nodes using directed edges to reflect the determined hierarchical relationships.

Figure 13:
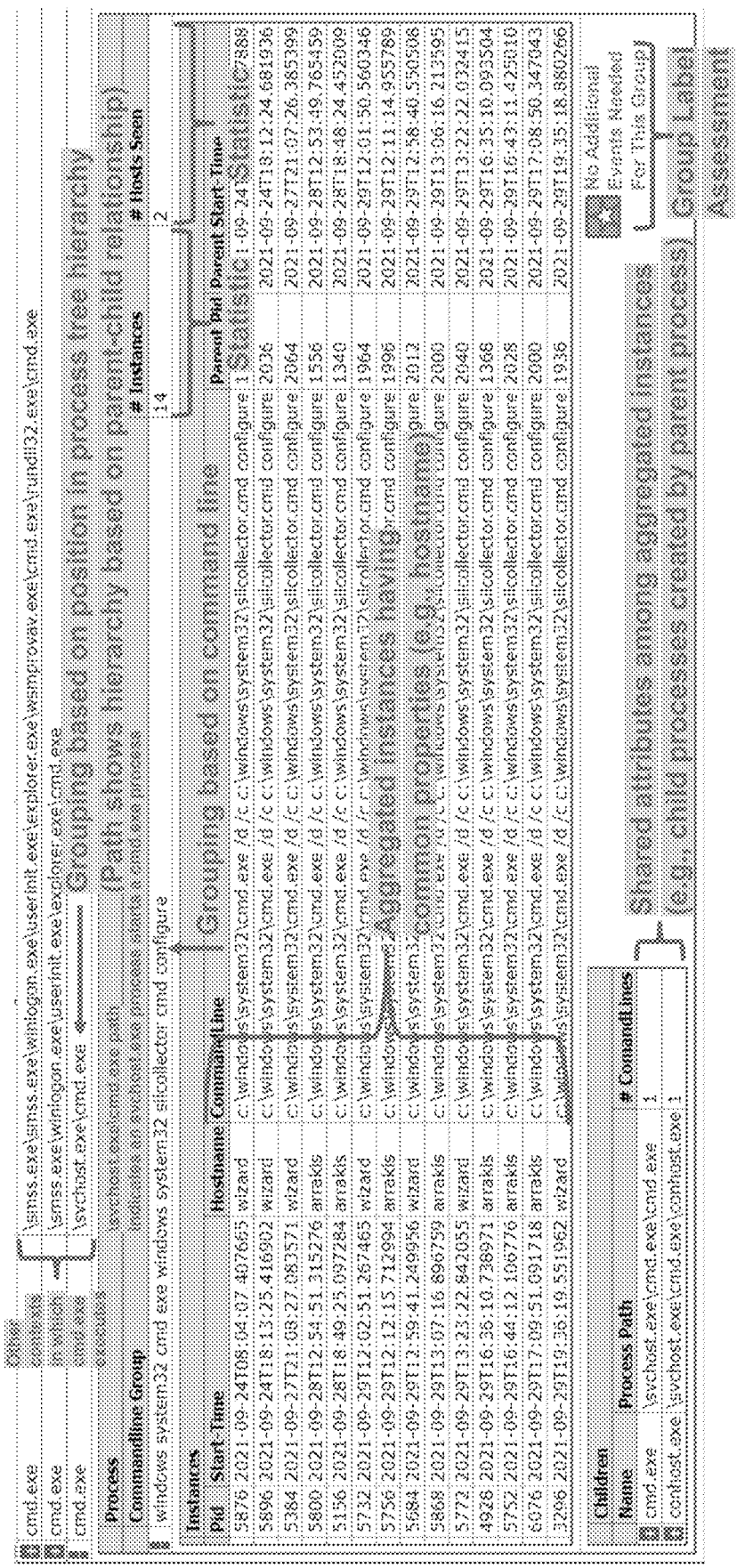
FIG. 13 shows an illustration of an example process for aggregating event records.

FIG. 13 shows an illustration 1300 of an example process for aggregating event records. In the example of FIG. 13 where the event log include process tree creation records, the grouping generally provides context among process instances. As shown, the each node can represent a respective executable, such as "cmd.exe", that is being executed by a process, and the grouping of the nodes can be based on position in process tree hierarchy, command line, or common process properties or attributes.

Generating the event clusters can include the operations of pruning certain nodes from an aggregated group of nodes included in each event cluster. This can improve data efficiency. In some examples, the system can prune a particular node from an aggregated group in cases where a measure of prevalence of an event record segment represented by the particular node is above some certain threshold, e.g., relative to the other segments represented by other nodes. For example, the measure of prevalence of an event record segment can be determined from a total count of the times that the event record segment appears in the received event log. In some examples, the system can prune a particular node in cases where a measure of similarity of an event record segment that is represented by the particular node with respect to the other segments represented by the other nodes is below some certain threshold. For example, the measure of similarity can be an entropy or edit distance between the segment represented by the particular node and the other segments represented by the other nodes.

Generating the event clusters can include the operations of applying dataset balancing techniques the aggregated group of nodes included in each of the plurality of event clusters. This can similarly improve data efficiency. In some examples, the system can do this by undersampling the nodes from a minority group, i.e., an aggregated group of a relatively small number of nodes, while oversampling the nodes from a majority group, i.e., an aggregated group of a relatively large number of nodes. Correspondingly, in these examples, only the content of the event records represented by the sampled nodes will be used by the system when constructing the graph, with the remaining, unsampled nodes discarded by the system.

Figure 14:
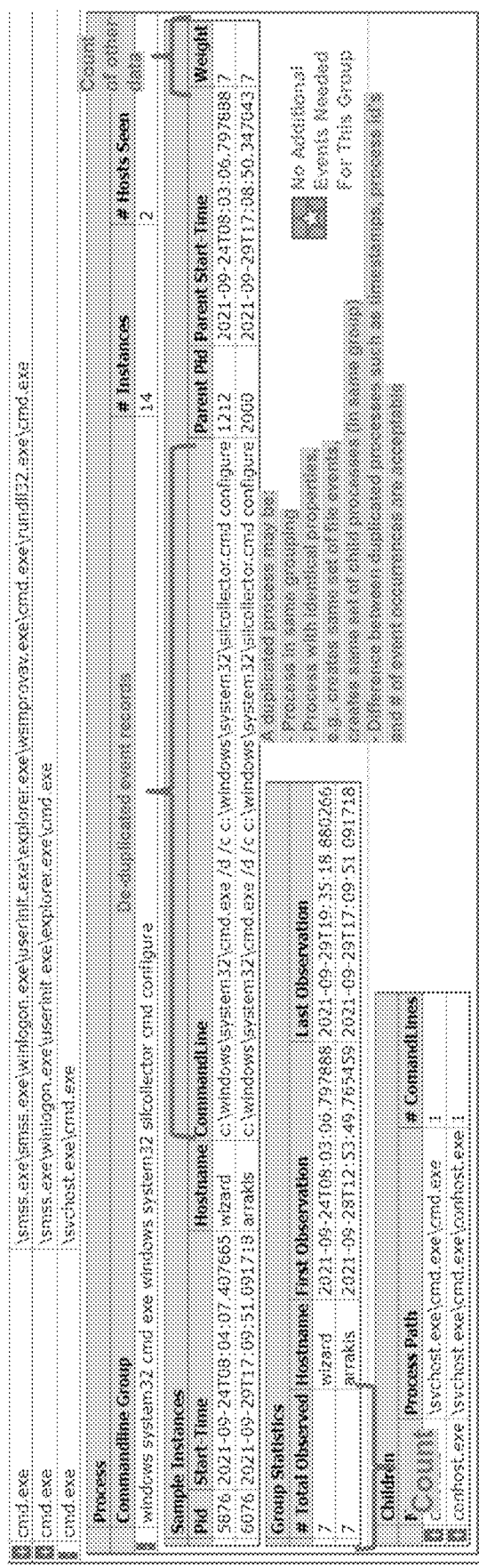
FIG. 14 shows an illustration of an example process for applying data reduction to an event log.

FIG. 14 shows an illustration 1400 of an example process for applying data reduction to an event log. In the example of FIG. 14 where the event log include process tree creation records, nodes that represent duplicated processes in an aggregated group, or processes with identical properties can be pruned, with a small number of nodes that are most representative of the aggregated group remain unpruned. As shown, after applying data reduction to the event clusters shown in the illustration 1300 of FIG. 13, the number of nodes that represent "sample instances" decreases from 14 to 2. Instead, only statistics data (e.g., node count number) of the original event clusters is kept.

In some implementations, after performing an iteration of process 200, the system persists data describing the generated graph into a database table in a data store, e.g., to a local disk or a distributed file system. The generated graph, which may be orders of magnitude smaller in size than the original event log data, facilitates better usage of the storage resource that would be otherwise required for storing the original event log in raw format.

In some implementations, the system can utilize the generated graph in other technical use cases including threat or suspicious activity detection.

Figure 3:
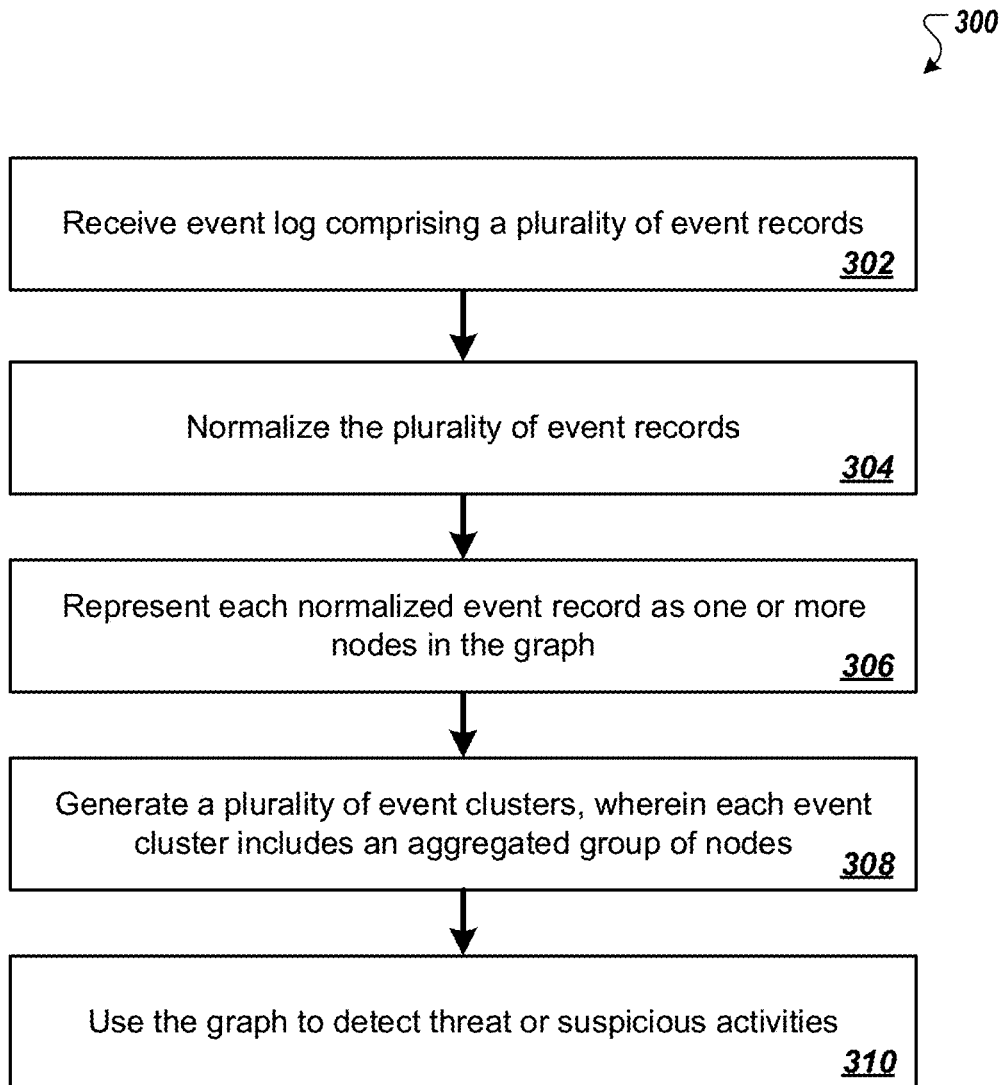
FIG. 3 is a flowchart showing an example process for using an event log to detect threat or suspicious activities, according to an implementation.

FIG. 3 is a flowchart showing an example process 300 for using an event log to detect threat or suspicious activities, according to an implementation. For convenience, the process 300 will be described as being performed by a system of one or more computers located in one or more locations. For example, a system, e.g., the event log processing system 100 of FIG. 1, appropriately programmed, can perform the process 300. The example process 300 shown in FIG. 3 may also be implemented using additional, fewer, or different operations, which can be performed in the order shown or in a different order.

The system receives an event log that includes a plurality of event records (302). Each event record describes one or more events that have occurred on a computer system over a period of time.

The system normalizes the plurality of event records (304), including anonymizing a unique identifier value in each event record and replacing a variable value in each event record with a predetermined value.

The system represents each normalized event record as one or more nodes in the graph (306). In some implementations, the system represents each different segment of a normalized event record as a respective node in the graph.

The system generates a plurality of event clusters from the normalized event records (308). Each event cluster includes an aggregated group of nodes and is generated based on common attributes of and hierarchical relationships between the normalized event records represented by the nodes in the aggregated group. The details of performing each of steps 302-308 are similarly described above with reference to FIG. 2.

The system then uses the generated graph to detect threat or suspicious activities (310). Generally, because of the way the graph has been generated, the process of threat or suspicious activity detection is made more efficient, more effective, or both, relative to directly using the raw event log.

In some implementations, the system can do so by applying a predetermined set of rules over the graph to determine whether the plurality of event records include one or more particular event attributes. The rules can include both user crafted rules and automated rules, e.g., those that implemented by machine learning algorithms. In the prior case, the rules may be defined by different entities, including different cybersecurity experts and tenant administrators, e.g., after viewing the visualizations of the graph or another compacted representation of the event log. In the latter case, the implementation and training details of the machine learning algorithms will be described further below. In some examples, the particular event attributes can include process name, command line expression, file path, user name, or event category, and the like. For example, the process name can be a particular process name that is associated with a known malware, and the command line can be a particular command line having an abnormal expression that is different from a known or common expression of the particular command line.

In particular, in some of these implementations, the system can use a rule-based engine to process the data describing the graph, data derived from the graph, or both and to generate a threat or suspicious behavior detection result, and, in some cases, to offer an automated response solution (e.g., blocking any malicious activity, or providing remediation guidance). A particular example of a suitable rule-based engine that can run on end-user device or another endpoint is described in https://www.blackberry.com/us/en/products/unified-endpoint-security/blackberry-optics.

In some implementations, to more effectively detect threat or suspicious activities, the system can leverage both the graph generated from the local event log and other available graphs, e.g., graphs generated from event logs of other computers both within or outside of a same organization. In some of these implementations, the system can compile or otherwise generate different event statistics from each graph, and compare the event statistics compiled from the local graph against other event statistics compiled from the other graphs, e.g., for anomaly or outlier detection. For example, the event statistics can include a total count of number of appearances of a particular attribute or property of an object/operation among the event log that corresponds to a graph.

In some implementations, as an automated approach to threat detection, the system implements one or more machine learning models and subsequently trains the models on training data derived from the generated graph to obtain the trained instances of the machine learning models. Each such model can be implemented, for example, as a neural network model, a random forest model, or a support vector machine (SVM) model, or another trainable model that is configurable to process the event log, feature information derived from the event log, or both and to generate a prediction of the existence of any threat or suspicious activity.

Generated a machine learning model from the graph data can include the operations of generating labeled training data from the graph, and training the machine learning model on the labeled training data using an appropriate machine learning training technique (e.g., a gradient-based supervised learning training technique) to determine the trained parameter values of the model. In some examples, the labeled training data can be generated by manually or automatically labeling each training input which corresponds to one or more event records and in accordance with the content of the event records. In some examples, balancing techniques can be used generating the labeled training data. For example, the system can do this in one context by undersampling the nodes from a minority group, i.e., an aggregated group of a relatively small number of nodes, while oversampling the nodes from a majority group, i.e., an aggregated group of a relatively large number of nodes. Correspondingly, in these examples, only the content of the event records represented by the sampled nodes will be used to generate the training inputs. This improves the quality of the training data and makes the learning problem easier.

In some implementations, the detected threat or suspicious activity can then be displayed on an output device of the system, e.g., on an end-user device.

In some implementations, the system can perform federated analytics using the generated graph.

FIG. 15 shows an illustration of an example federated analytics environment 1500. As shown in FIG. 15A, the federated analytics environment 1500 includes a server computing device 1502 implementing a global analytics system, and a large number of client computing devices 1504A-N each implementing an event log processing system, e.g., the event log processing system 100 of FIG. 1. Each client computing device 1504A-N maintains a respective local event log 1506A-N.

Each client computing device 1504A-N can be, for example, a desktop computer, laptop computer, a tablet computer, a wearable computer, a cellular phone, a smart phone, a music player, an e-book reader, a navigation system, or any other appropriate computing device that is capable of transmitting and receiving data over a data communication network (e.g., the internet).

Event log data 1506A-N can be generated by different components of the client computing device and as a result of interaction between the client computing device with a user of the device (e.g., from a command console or by another appropriate access method), external or third parties, other automated applications, as well as any other appropriate entities, individuals, systems, or computers. In some examples, the event data may comprise information about a file write event, a file read event, or a file manipulation event (e.g., cut, paste, copy, move, open, read, save, etc.) of at least a portion of a digital file stored on the client computing device. In some examples, the event data may comprise information about a process creation (or termination) of the application installed on the client computing device, a logon of the application, accounts performing process creations or logons, or the like.

In contrast, the server computing device 1502 can be implemented by one or more computers located in one or more locations. For example, the server computing device 1502 may be hosted within a data center, which can be a distributed computing system having hundreds or thousands of computers in one or more locations.

The server computing device 1502 interacts with the client computing devices 1504A-N to perform federated analytics using the local event logs 1506A-N maintained across the client computing devices 1504A-N. As a new distributed computing paradigm for data analytics applications with privacy concern, federated analytics enables organizations to analyze a population of user-generated data in a privacy-preserving and secure way.

In some examples, by performing federated analytics the server computing device 1502 can determine whether a client computing device has a security risk based on a frequency and pattern analysis of different event records generated by the client computing device. In some examples, as a result of performing federated analytics each client computing device 1504A-N can perform data compaction on the local event log 1506A-N according to a compaction strategy determined from the federated analysis result. An example of suitable federated analytics algorithms that can be used in these examples is described in more detail in Zhu, Wennan, et al. "Federatedheavy hitters discovery with differential privacy." International Conference on Artificial Intelligence and Statistics. PMLR, 2020, the entire contents of which are hereby incorporated by reference herein in their entirety. This example federated analytics algorithm facilitates discovery of the "heavy hitters," i.e., most frequent items, in a population of user-generated data strong privacy guarantees incur substantial privacy risks.

Figure 4:
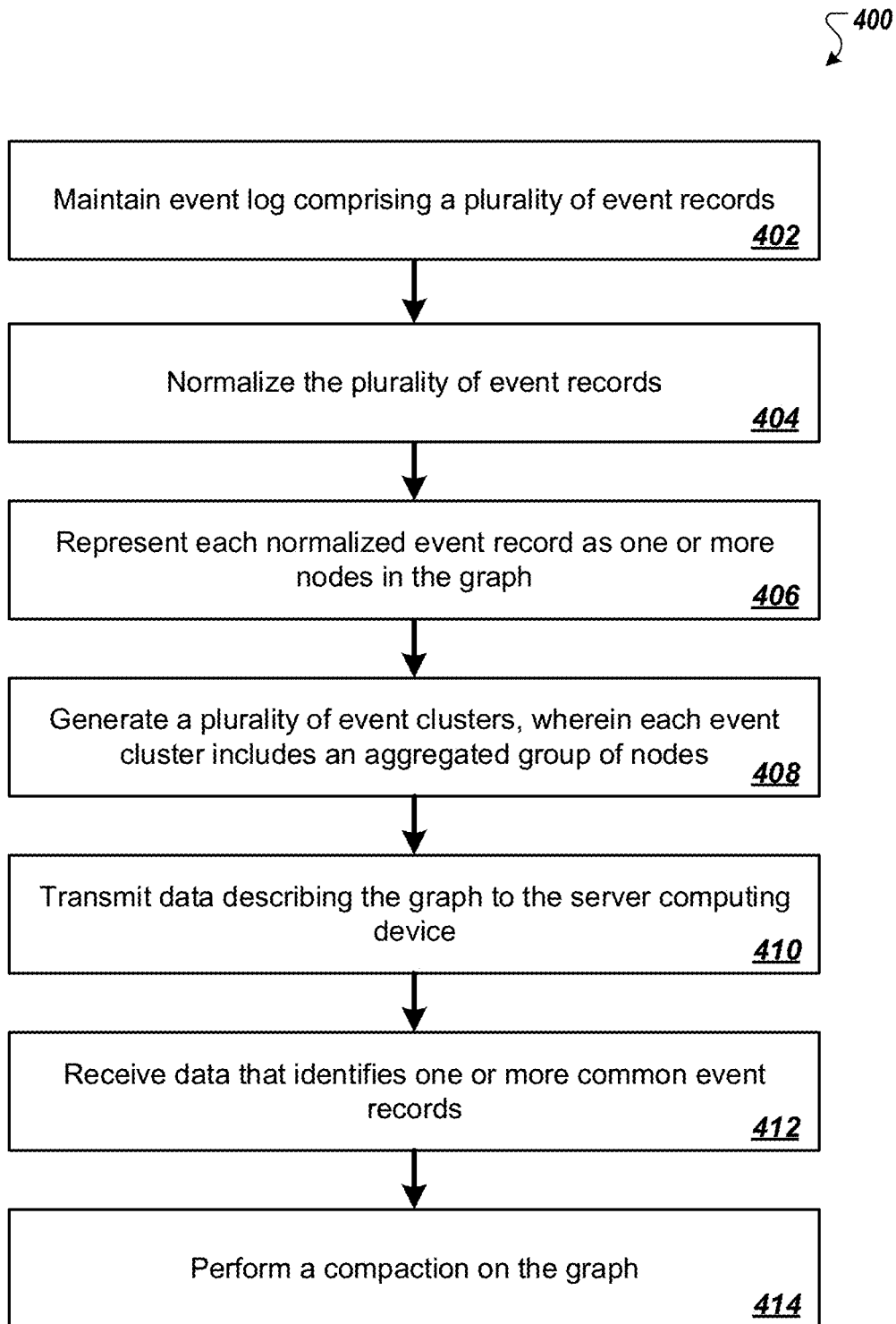
FIG. 4 is a flowchart showing an example process for performing federated analytics using an event log by a client computing device, according to an implementation.

FIG. 4 is a flowchart showing an example process 400 for performing federated analytics using an event log by a client computing device, according to an implementation. For convenience, the process 400 will be described as being performed by a system of one or more computers located in one or more locations. For example, a system, e.g., the client computing device 1504A-N of FIG. 15, appropriately programmed, can perform the process 400. The example process 400 shown in FIG. 4 may also be implemented using additional, fewer, or different operations, which can be performed in the order shown or in a different order.

The system maintains an event log that includes a plurality of event records (402). Each event record describes one or more events that have occurred on the client computing device on which the system is implemented over a period of time.

The system normalizes the plurality of event records (404), including anonymizing a unique identifier value in each event record and replacing a variable value in each event record with a predetermined value.

The system represents each normalized event record as one or more nodes in the graph (406). In some implementations, the system represents each different segment of a normalized event record as a respective node in the graph.

The system generates a plurality of event clusters from the normalized event records (408). Each event cluster includes an aggregated group of nodes and is generated based on common attributes of and hierarchical relationships between the normalized event records represented by the nodes in the aggregated group. The details of performing each of steps 402-408 are similarly described above with reference to FIG. 2.

The system then transmits data describing the graph to the server computing device over the data communication network (410), as shown in FIG. 15B. In some implementations, the system can transmit the data that describes the graph in its entirety. In other implementations, the system can first select, from the plurality of event clusters included in the graph, one or more selected event clusters that each include an aggregated group of nodes that are above a threshold number, and then transmits data describing only the selected event clusters to the server computing device.

In response, the system receives, from the server computing device and over the data communication network, data that identifies one or more most common event records among the event logs maintained by different client computing devices (412), as shown in FIG. 15D. Additionally or alternatively, the received data can identify one or more objects and/or one or more operations performed on the objects that occur most frequently among the event logs maintained by different client computing devices.

The system performs, in accordance with a compaction strategy determined from the received data, a compaction on the graph that has been generated from the maintained event log (414). In some implementations, the system can perform compaction on the graph data to generate a further compacted graph, for example consolidating nodes that represent the most common event records. In these implementations, the further compacted graph can be stored by the system, i.e., instead of the complete graph and much less the raw event log. In some implementations, previously generated graph data may be discarded by the system as newly generated graph data become available during operation of the system, for example discarding the oldest (or the most obsolete) first.

Figure 5:
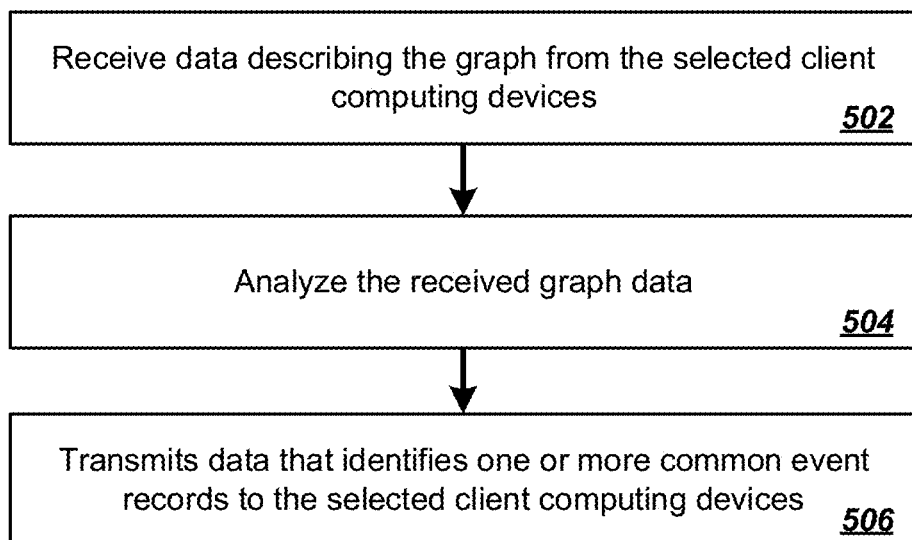
FIG. 5 is a flowchart showing an example process for performing federated analytics using event log by a server computing device, according to an implementation.

FIG. 5 is a flowchart showing an example process 500 for performing federated analytics using event log by a server computing device, according to an implementation. For convenience, the process 500 will be described as being performed by a system of one or more computers located in one or more locations. For example, a system, e.g., the server computing device 1502 of FIG. 15, appropriately programmed, can perform the process 500. The example process 500 shown in FIG. 5 may also be implemented using additional, fewer, or different operations, which can be performed in the order shown or in a different order.

The system receives, from each client computing device in a selected subset of client computing devices, data describing the graph generated from the local event log maintained by the selected client computing device (502), as shown in FIG. 15B. The system can select the client computing devices in any of a variety of ways. For example, the system can make this selection with uniform randomness or some other advanced client selection techniques that are, e.g., dependent on network stability or computation resource availability or both of the client computing devices.

The system analyzes the received graph data, e.g., by using heavy hitter algorithm or count-min sketch algorithm, to identify one or more most common event records among the event logs maintained by different client computing devices (504), as shown in FIG. 15C. Additionally or alternatively, the system can identify one or more objects and/or one or more operations performed on the objects that occur most frequently among the event logs maintained by different client computing devices.

In some implementations, to identify the one or more most common event records, the system can repeatedly perform multiple iterations of steps 502 and 504. In each iteration, a selected subset of client computing devices transmit a "vote" for the nodes representing one or more event records as an extension to a graph of nodes representing popular event records discovered in previous rounds. The global analytics system then aggregates the received votes, prunes nodes that have counts that fall below certain threshold, and continues to the next round.

The system transmits data that identifies the one or more most common event records to each client computing device in the selected subset of client computing devices (506), as shown in FIG. 15D. Additionally or alternatively, the system can transmit other analysis results, including data that identifies one or more objects and/or one or more operations performed on the objects that occur most frequently among the event logs maintained by different client computing devices.

Described implementations of the subject matter can include one or more features, alone or in combination.

For example, in a first implementation, a computer-implemented method, comprising: receiving an event log comprising a plurality of event records, each of the event records describing one or more events that have occurred on each of one or more computer systems over a period of time; and converting the event log into a graph by using a respective set of conversion algorithms that are specific to an operating system (OS) running on each of the one or more computer systems at the time the event records were created, wherein converting the event log comprises: normalizing the plurality of event records, wherein normalizing the plurality of event records comprises anonymizing a unique identifier value in each event record and replacing a variable value in each event record with a predetermined value; representing each normalized event record as one or more nodes in the graph; and generating a plurality of event clusters, wherein each event cluster includes an aggregated group of nodes and is generated based on common attributes of and hierarchical relationships between the normalized event records represented by the nodes in the aggregated group.

The foregoing and other described implementations can each, optionally, include one or more of the following features:

A first feature, combinable with any of the following features, wherein converting the event log into the graph comprises: selecting as the respective set of conversion algorithms a set of conversion algorithms that corresponds to the operating system (OS) running on the computer system from a plurality of candidate sets of conversion algorithms that correspond respectively to different operating systems.

A second feature, combinable with any of the following features, wherein receiving the event log comprises receiving file path data, or process tree data.

A third feature, combinable with any of the following features, wherein normalizing the plurality of event records further comprises removing punctuations in each event record.

A fourth feature, combinable with any of the following features, wherein representing each normalized event record as one or more nodes in the graph comprises: representing different segments of the normalized event record as different nodes.

A fifth feature, combinable with any of the following features, wherein representing different segments of the normalized event record as different nodes comprises, for each different segment: replacing the different segment with a respective predetermined value.

A sixth feature, combinable with any of the following features, wherein the respective predetermined value comprises a hash value generated by applying a predetermined hash function to the different segment.

A seventh feature, combinable with any of the following features, wherein generating the plurality of event clusters comprises, for each event cluster: determining the hierarchical relationships between the normalized event records from the directory path data, or the process tree data; connecting the nodes included in the aggregated group of nodes in accordance with the determined hierarchical relationships.

A eighth feature, combinable with any of the following features, wherein the common attributes of the normalized event records represented by the nodes in the aggregated group comprise common attributes of the normalized event records that are derived by using a deterministic finite automaton (DFA) algorithm.

A nineth feature, combinable with any of the following features, wherein the common attributes of the normalized event records represented by the nodes in the aggregated group comprise a common segment of the normalized event records.

A tenth feature, combinable with any of the following features, wherein generating the plurality of event clusters comprises, for the aggregated group of nodes included in each event cluster: pruning a first node based on a measure of prevalence of a first segment of a normalized event record that is represented by the first node with respect to other segments represented by other nodes; and pruning a second node based on a measure of similarity of a second segment of a normalized event record that is represented by the second node with respect to the other segments represented by the other nodes.

A eleventh feature, combinable with any of the following features, wherein the measure of prevalence comprise a total count of the first segment in the plurality of event records; and the measure of similarity comprises an entropy or edit distance between the second segment and the other segments represented by the other nodes.

A twelfth feature, combinable with any of the following features, wherein generating the plurality of event clusters comprises: using dataset balancing techniques to sample nodes from the aggregated group of nodes included in each of the plurality of event clusters.

A thirteenth feature, combinable with any of the following features, wherein each node in the graph represents event properties or attributes of the associated normalized event record.

A fourteenth feature, combinable with any of the following features, wherein the method further comprises persisting the graph into a database table in a data store.

In a second implementation, a computer-readable medium storing instructions which, when executed, cause a computing device to perform operations comprising: receiving an event log comprising a plurality of event records, each of the event records describing one or more events that have occurred on each of one or more computer systems over a period of time; and converting the event log into a graph by using a respective set of conversion algorithms that are specific to an operating system (OS) running on each of the one or more computer systems at the time the event records were created, wherein converting the event log comprises: normalizing the plurality of event records, wherein normalizing the plurality of event records comprises anonymizing a unique identifier value in each event record and replacing a variable value in each event record with a predetermined value; representing each normalized event record as one or more nodes in the graph; and generating a plurality of event clusters, wherein each event cluster includes an aggregated group of nodes and is generated based on common attributes of and hierarchical relationships between the normalized event records represented by the nodes in the aggregated group.

The foregoing and other described implementations can each, optionally, include one or more of the following features:

A first feature, combinable with any of the following features, wherein converting the event log into the graph comprises: selecting as the respective set of conversion algorithms a set of conversion algorithms that corresponds to the operating system (OS) running on the computer system from a plurality of candidate sets of conversion algorithms that correspond respectively to different operating systems.

A second feature, combinable with any of the following features, wherein receiving the event log comprises receiving file path data, or process tree data.

A third feature, combinable with any of the following features, wherein normalizing the plurality of event records further comprises removing punctuations in each event record.

A fourth feature, combinable with any of the following features, wherein representing each normalized event record as one or more nodes in the graph comprises: representing different segments of the normalized event record as different nodes.

A fifth feature, combinable with any of the following features, wherein representing different segments of the normalized event record as different nodes comprises, for each different segment: replacing the different segment with a respective predetermined value.

A sixth feature, combinable with any of the following features, wherein the respective predetermined value comprises a hash value generated by applying a predetermined hash function to the different segment.

A seventh feature, combinable with any of the following features, wherein generating the plurality of event clusters comprises, for each event cluster: determining the hierarchical relationships between the normalized event records from the directory path data, or the process tree data; connecting the nodes included in the aggregated group of nodes in accordance with the determined hierarchical relationships.

A eighth feature, combinable with any of the following features, wherein the common attributes of the normalized event records represented by the nodes in the aggregated group comprise common attributes of the normalized event records that are derived by using a deterministic finite automaton (DFA) algorithm.

A nineth feature, combinable with any of the following features, wherein the common attributes of the normalized event records represented by the nodes in the aggregated group comprise a common segment of the normalized event records.

A tenth feature, combinable with any of the following features, wherein generating the plurality of event clusters comprises, for the aggregated group of nodes included in each event cluster: pruning a first node based on a measure of prevalence of a first segment of a normalized event record that is represented by the first node with respect to other segments represented by other nodes; and pruning a second node based on a measure of similarity of a second segment of a normalized event record that is represented by the second node with respect to the other segments represented by the other nodes.

A eleventh feature, combinable with any of the following features, wherein the measure of prevalence comprise a total count of the first segment in the plurality of event records; and the measure of similarity comprises an entropy or edit distance between the second segment and the other segments represented by the other nodes.

A twelfth feature, combinable with any of the following features, wherein generating the plurality of event clusters comprises: using dataset balancing techniques to sample nodes from the aggregated group of nodes included in each of the plurality of event clusters.

A thirteenth feature, combinable with any of the following features, wherein each node in the graph represents event properties or attributes of the associated normalized event record.

A fourteenth feature, combinable with any of the following features, wherein the operations further comprise persisting the graph into a database table in a data store.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: receiving an event log comprising a plurality of event records, each of the event records describing one or more events that have occurred on each of one or more computer systems over a period of time; and converting the event log into a graph by using a respective set of conversion algorithms that are specific to an operating system (OS) running on each of the one or more computer systems at the time the event records were created, wherein converting the event log comprises: normalizing the plurality of event records, wherein normalizing the plurality of event records comprises anonymizing a unique identifier value in each event record and replacing a variable value in each event record with a predetermined value; representing each normalized event record as one or more nodes in the graph; and generating a plurality of event clusters, wherein each event cluster includes an aggregated group of nodes and is generated based on common attributes of and hierarchical relationships between the normalized event records represented by the nodes in the aggregated group.

The foregoing and other described implementations can each, optionally, include one or more of the following features:

A first feature, combinable with any of the following features, wherein converting the event log into the graph comprises: selecting as the respective set of conversion algorithms a set of conversion algorithms that corresponds to the operating system (OS) running on the computer system from a plurality of candidate sets of conversion algorithms that correspond respectively to different operating systems.

A second feature, combinable with any of the following features, wherein receiving the event log comprises receiving file path data, or process tree data.

A third feature, combinable with any of the following features, wherein normalizing the plurality of event records further comprises removing punctuations in each event record.

A fourth feature, combinable with any of the following features, wherein representing each normalized event record as one or more nodes in the graph comprises: representing different segments of the normalized event record as different nodes.

A fifth feature, combinable with any of the following features, wherein representing different segments of the normalized event record as different nodes comprises, for each different segment: replacing the different segment with a respective predetermined value.

A sixth feature, combinable with any of the following features, wherein the respective predetermined value comprises a hash value generated by applying a predetermined hash function to the different segment.

A seventh feature, combinable with any of the following features, wherein generating the plurality of event clusters comprises, for each event cluster: determining the hierarchical relationships between the normalized event records from the directory path data, or the process tree data; connecting the nodes included in the aggregated group of nodes in accordance with the determined hierarchical relationships.

A eighth feature, combinable with any of the following features, wherein the common attributes of the normalized event records represented by the nodes in the aggregated group comprise common attributes of the normalized event records that are derived by using a deterministic finite automaton (DFA) algorithm.

A nineth feature, combinable with any of the following features, wherein the common attributes of the normalized event records represented by the nodes in the aggregated group comprise a common segment of the normalized event records.

A tenth feature, combinable with any of the following features, wherein generating the plurality of event clusters comprises, for the aggregated group of nodes included in each event cluster: pruning a first node based on a measure of prevalence of a first segment of a normalized event record that is represented by the first node with respect to other segments represented by other nodes; and pruning a second node based on a measure of similarity of a second segment of a normalized event record that is represented by the second node with respect to the other segments represented by the other nodes.

A eleventh feature, combinable with any of the following features, wherein the measure of prevalence comprise a total count of the first segment in the plurality of event records; and the measure of similarity comprises an entropy or edit distance between the second segment and the other segments represented by the other nodes.

A twelfth feature, combinable with any of the following features, wherein generating the plurality of event clusters comprises: using dataset balancing techniques to sample nodes from the aggregated group of nodes included in each of the plurality of event clusters.

A thirteenth feature, combinable with any of the following features, wherein each node in the graph represents event properties or attributes of the associated normalized event record.

A fourteenth feature, combinable with any of the following features, wherein the operations further comprise persisting the graph into a database table in a data store.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a standalone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
receiving an event log comprising a plurality of event records, each of the event records describing one or more events that have occurred on each of one or more computer systems over a period of time;
converting the event log into a graph by using a respective set of conversion algorithms that are specific to an operating system (OS) running on each of the one or more computer systems at the time the event records were created, wherein converting the event log comprises:
normalizing the plurality of event records, wherein normalizing the plurality of event records comprises anonymizing a unique identifier value in each event record and replacing a variable value in each event record with a predetermined value;
representing each normalized event record as one or more nodes in the graph, wherein the representing comprises representing different segments of each normalized event record as different nodes in the graph;
generating a plurality of event clusters, wherein each event cluster includes an aggregated group of nodes and is generated based on common attributes of and hierarchical relationships between the normalized event records represented by the nodes in the aggregated group; and
generating one or more pruned event clusters, wherein the generating comprises, for the aggregated group of nodes included in each of one or more of the plurality of event clusters:
determining that a total count of times that a first segment of a normalized event record that is represented by a first node appears in the plurality of event records is above a threshold count; and
in response to determining that the total count of times is above the threshold count, pruning the first node that has the total count of times that is above the threshold count from the aggregated group of nodes; and
storing the graph in a data store, wherein the graph has a smaller data size than the event log and thus consumes a smaller amount of storage resources compared to the event log when stored in the data store.

2. The method of claim 1, wherein converting the event log into the graph comprises:
selecting as the respective set of conversion algorithms a set of conversion algorithms that corresponds to the operating system (OS) running on the computer system from a plurality of candidate sets of conversion algorithms that correspond respectively to different operating systems.

3. The method of claim 1, wherein receiving the event log comprises receiving file path data, or process tree data.

4. The method of claim 1, wherein normalizing the plurality of event records further comprises removing punctuations in each event record.

5. The method of claim 1, wherein representing each normalized event record as one or more nodes in the graph comprises:
representing different segments of the normalized event record as different nodes.

6. The method of claim 5, wherein representing different segments of the normalized event record as different nodes comprises, for each different segment:
replacing the different segment with a respective predetermined value.

7. The method of claim 6, wherein the respective predetermined value comprises a hash value generated by applying a predetermined hash function to the different segment.

8. The method of claim 3, wherein generating the plurality of event clusters comprises, for each event cluster:
determining the hierarchical relationships between the normalized event records from the directory path data, or the process tree data;
connecting the nodes included in the aggregated group of nodes in accordance with the determined hierarchical relationships.

9. The method of claim 1, wherein the common attributes of the normalized event records represented by the nodes in the aggregated group comprise common attributes of the normalized event records that are derived by using a deterministic finite automaton (DFA) algorithm.

10. The method of claim 1, wherein the common attributes of the normalized event records represented by the nodes in the aggregated group comprise a common segment of the normalized event records.

11. The method of claim 5, wherein generating the one or more pruned event clusters comprises, for the aggregated group of nodes included in each of one or more of the plurality of event clusters:
pruning a second node based on a measure of similarity of a second segment of a normalized event record that is represented by the second node with respect to the other segments represented by the other nodes.

12. The method of claim 11, wherein:
the measure of similarity comprises an entropy or edit distance between the second segment and the other segments represented by the other nodes.

13. The method of claim 1, wherein generating the one or more pruned event clusters comprises:
using dataset balancing techniques to sample nodes from the aggregated group of nodes included in each of the plurality of event clusters.

14. The method of claim 1, wherein each node in the graph represents event properties or attributes of the associated normalized event record.

15. The method of claim 1, wherein storing the graph in the data store comprises storing the graph in place of the event log in the data store.

16. A computer-implemented system, comprising
one or more computers; and
one or more computer memory devices interoperably coupled with the one or more computers and having machine-readable media storing one or more instructions that, when executed by the one or more computers, perform operations comprising:
receiving an event log comprising a plurality of event records, each of the event records describing one or more events that have occurred on each of one or more computer systems over a period of time;
converting the event log into a graph by using a respective set of conversion algorithms that are specific to an operating system (OS) running on each of the one or more computer systems at the time the event records were created, wherein converting the event log comprises:
normalizing the plurality of event records, wherein normalizing the plurality of event records comprises anonymizing a unique identifier value in each event record and replacing a variable value in each event record with a predetermined value;
representing each normalized event record as one or more nodes in the graph, wherein the representing comprises representing different segments of each normalized event record as different nodes in the graph;
generating a plurality of event clusters, wherein each event cluster includes an aggregated group of nodes and is generated based on common attributes of and hierarchical relationships between the normalized event records represented by the nodes in the aggregated group; and
generating one or more pruned event clusters, wherein the generating comprises, for the aggregated group of nodes included in each of one or more of the plurality of event clusters:
determining that a total count of times that a first segment of a normalized event record that is represented by a first node appears in the plurality of event records is above a threshold count; and
in response to determining that the total count of times is above the threshold count, pruning the first node that has the total count of times that is above the threshold count from the aggregated group of nodes; and
storing the graph in a data store, wherein the graph has a smaller data size than the event log and thus consumes a smaller amount of storage resources compared to the event log when stored in the data store.

17. The system of claim 16, wherein converting the event log into the graph comprises:
selecting as the respective set of conversion algorithms a set of conversion algorithms that corresponds to the operating system (OS) running on the computer system from a plurality of candidate sets of conversion algorithms that correspond respectively to different operating systems.

18. The system of claim 16, wherein receiving the event log comprises receiving file path data, or process tree data.

19. A non-transitory computer-readable medium storing instructions which, when executed, cause a computing device to perform operations comprising:
receiving an event log comprising a plurality of event records, each of the event records describing one or more events that have occurred on each of one or more computer systems over a period of time;
converting the event log into a graph by using a respective set of conversion algorithms that are specific to an operating system (OS) running on each of the one or more computer systems at the time the event records were created, wherein converting the event log comprises:
normalizing the plurality of event records, wherein normalizing the plurality of event records comprises anonymizing a unique identifier value in each event record and replacing a variable value in each event record with a predetermined value;
representing each normalized event record as one or more nodes in the graph, wherein the representing comprises representing different segments of each normalized event record as different nodes in the graph;
generating a plurality of event clusters, wherein each event cluster includes an aggregated group of nodes and is generated based on common attributes of and hierarchical relationships between the normalized event records represented by the nodes in the aggregated group; and
generating one or more pruned event clusters, wherein the generating comprises, for the aggregated group of nodes included in each of one or more of the plurality of event clusters:
determining that a total count of times that a first segment of a normalized event record that is represented by a first node appears in the plurality of event records is above a threshold count; and
in response to determining that the total count of times is above the threshold count, pruning the first node that has the total count of times that is above the threshold count from the aggregated group of nodes; and
storing the graph in a data store, wherein the graph has a smaller data size than the event log and thus consumes a smaller amount of storage resources compared to the event log when stored in the data store.

20. The system of claim 16, wherein storing the graph in the data store comprises storing the graph in place of the event log in the data store.

* * * * *